(12) United States Patent
Dharmaji

(10) Patent No.: US 10,324,587 B2
(45) Date of Patent: Jun. 18, 2019

(54) PARTICIPANT SELECTION AND ABUSE PREVENTION FOR INTERACTIVE VIDEO SESSIONS

(71) Applicant: Vyu Labs, Inc., Cupertino, CA (US)

(72) Inventor: Srinivasa M. Dharmaji, Cupertino, CA (US)

(73) Assignee: Vyu Labs, Inc., Cupertino, CA (US)

( * ) Notice: Subject to any disclaimer, the term of this patent is extended or adjusted under 35 U.S.C. 154(b) by 161 days.

(21) Appl. No.: 15/235,455

(22) Filed: Aug. 12, 2016

(65) Prior Publication Data

US 2017/0048282 A1 Feb. 16, 2017

Related U.S. Application Data

(60) Provisional application No. 62/204,916, filed on Aug. 13, 2015.

(51) Int. Cl.
*G06F 3/0482* (2013.01)
*H04L 12/58* (2006.01)
*G06F 3/14* (2006.01)

(52) U.S. Cl.
CPC .......... *G06F 3/0482* (2013.01); *G06F 3/1423* (2013.01); *G06F 3/1438* (2013.01); *G06F 3/1454* (2013.01); *H04L 51/32* (2013.01); *G09G 2340/14* (2013.01); *G09G 2370/042* (2013.01)

(58) Field of Classification Search
CPC .......................... H04L 12/18222; H04L 51/32
See application file for complete search history.

(56) References Cited

U.S. PATENT DOCUMENTS

| | | | |
|---|---|---|---|
| 7,685,237 B1* | 3/2010 | Weaver | G06Q 10/10 709/205 |
| 9,277,179 B1* | 3/2016 | Fulay | H04N 7/15 |
| 9,716,674 B2* | 7/2017 | Ciofalo | H04L 51/02 |
| 2002/0010584 A1* | 1/2002 | Schultz | G06F 3/16 704/270 |
| 2002/0023130 A1* | 2/2002 | Stettner | H04N 5/4401 709/205 |
| 2002/0085030 A1* | 7/2002 | Ghani | G06O 10/10 715/751 |

(Continued)

*Primary Examiner* — Lashonda T Jacobs
(74) *Attorney, Agent, or Firm* — Michael A. Glenn; Perkins Coie LLP

(57) ABSTRACT

Techniques are described for participant selection and abuse prevention in paced, synchronous interactive sessions that include, in some embodiments, live video communications. In an embodiment a process for participant selection to prevent abuse can include receiving a request to initiate an interactive session that includes a participant selection criterion. The request is received at a computer system operating as part of a platform for facilitating paced, synchronous interactive sessions and may be based on inputs received from a host user (e.g. a celebrity at a host user device. The receiving computer system can then apply the received participant selection criterion to select a participant from the multiple participants connected to the interactive session. This selected participant is then allowed to broadcast a media stream (e.g. including live or pre-recorded video) that is viewable by the host and the other participants. In some embodiments, the participant selection criterion can include, pre-filtering, pre-selection, pre-recording, geo-targeting, and/or blacklisting.

22 Claims, 32 Drawing Sheets

(56) References Cited

U.S. PATENT DOCUMENTS

| | | | | |
|---|---|---|---|---|
| 2007/0168237 | A1* | 7/2007 | Campbell | G06Q 10/02 705/5 |
| 2008/0010347 | A1* | 1/2008 | Houghton | H04L 29/06027 709/205 |
| 2008/0031433 | A1* | 2/2008 | Sapp | H04L 12/1818 379/92.03 |
| 2008/0065998 | A1* | 3/2008 | Brown | H04M 3/56 715/755 |
| 2008/0229215 | A1* | 9/2008 | Baron | G06N 3/006 715/751 |
| 2009/0112680 | A1* | 4/2009 | Dovrath | G06Q 30/0215 705/26.3 |
| 2014/0114790 | A1* | 4/2014 | Ayodele | G06Q 30/08 705/26.3 |
| 2014/0149522 | A1* | 5/2014 | Mok | H04L 51/04 709/206 |
| 2014/0171179 | A1* | 6/2014 | Ball | G07F 17/32 463/25 |
| 2014/0173648 | A1* | 6/2014 | Ball | H04N 21/25 725/25 |
| 2014/0214650 | A1* | 7/2014 | Sayyaparaju | G06F 3/0484 705/39 |
| 2014/0223464 | A1* | 8/2014 | Moran | H04N 21/4788 725/12 |
| 2014/0298200 | A1* | 10/2014 | Cierniak | H04L 65/1069 715/753 |
| 2015/0170101 | A1* | 6/2015 | Fair | G06Q 10/101 705/300 |
| 2015/0301720 | A1* | 10/2015 | Gottlieb | H04L 65/4038 715/753 |
| 2016/0057083 | A1* | 2/2016 | Ciofalo | H04L 51/02 709/206 |
| 2017/0272476 | A1* | 9/2017 | Ciofalo | G06F 3/04842 |

* cited by examiner

PARTICIPANT SELECTION AND ABUSE PREVENTION FOR INTERACTIVE VIDEO SESSIONS

CROSS-REFERENCE TO RELATED APPLICATION(S)

This application claims priority to and the benefit of U.S. Provisional Application 62/204,916, entitled "FAN SELECTION AND ABUSE PREVENTION ALGORITHMS FOR LIVE VIDEO INTERACTIONS DURING CELEBRITY Q&A BROADCASTS" filed on Aug. 13, 2015.

TECHNICAL FIELD

Various of the disclosed embodiments concern techniques and systems for enabling paced, real-time interactions between a celebrity and one or more audience members having limited participation capabilities.

BACKGROUND

Social interactions or exchanges between two or more individuals can, and often do, improve the relationships between those individuals. In fact, social relationships are often strongest between those individuals who interact with one another the most (e.g., family members and friends).

Social relationships may be central to the success of certain individuals. For example, popular individuals who have attained success in sports, entertainment, business, etc., (also referred to herein as "celebrities") may be paid more for advertising or endorsing a product if they have a significant social media following or a large number of fans in particular marketing segments. However, it is often difficult for celebrities to have meaningful interactions with their fans for a variety of reasons (e.g., lack of control or time).

SUMMARY

Systems and techniques for selecting participants and preventing abuse in paced, synchronous interactive sessions are described herein. In an embodiment, high profile individuals such as celebrities may host interactive sessions with a plurality of participants. Oftentimes, the participants will act as "audience members" with limited and qualified participation capabilities. For example, some participants may only be able to watch a live video stream of the celebrity, while selected participants may be able to initiate a live video stream in which they ask the celebrity questions, answer questions posed by the celebrity, etc.

Both the host (e.g. a celebrity) and the participants can access an interactive session via an application executing on a user device. The application may be able to present a variety of interfaces for different situations. For example, the host may be able to access a recording interface that includes useful icons for live streaming (e.g., initiate stream, terminate stream, visual or audible filters, etc.), while an audience member may only be able to access a presentation interface that simply allows the audience member to view/hear the streamed media.

In an embodiment, a process for participant selection to prevent abuse can include receiving a request to initiate an interactive session that includes a participant selection criterion. The request is received at a computer system operating as part of a platform for facilitating paced, synchronous interactive sessions and may be based on inputs received from a host user (e.g. a celebrity at a host user device. The receiving computer system can then apply the received participant selection criterion to select a participant from the multiple participants connected to the interactive session. This selected participant is then allowed to broadcast a media stream (e.g. including live or pre-recorded video) that is viewable by the host and the other participants. In some embodiments, the participant selection criterion can include, pre-filtering, pre-selection, pre-recording, geo-targeting, and/or blacklisting.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

From the foregoing, it will be appreciated that specific embodiments of the invention have been described herein for purposes of illustration, but that various modifications may be made without deviating from the scope of the invention. Accordingly, the invention is not limited except as by the appended claims.

Overview

Techniques described herein provide for an effective communications mechanism through which celebrities can connect with their fans, for example via live streamed video interactions. High profile individuals such as celebrities and politicians are often concerned with the brand image they convey. Live interaction with participants via an interactive session can introduce content that may not be conducive to the brand image that a celebrity is trying to convey. For example, live interactions with unknown participants can lead to questions or comments during a session that may be inappropriate, offensive, or that may otherwise cause embarrassment on the part of the celebrity. Accordingly, mechanisms are needed that enable a celebrity host of the interactive session to select or screen the participants with which they interact with during an interactive session. Enabling this level of control for the celebrity host provides a brand-safe environment that in turn encourages further direct interaction between the celebrity and their fans. In some embodiments, these participant selection mechanisms include, but are not limited to pre-filtering, pre-selection, pre-recording, geo-targeting, and blacklisting. These example fan selection mechanisms are described in more detail below.

Operating Environment—Example Computing Platform

Figure 1:
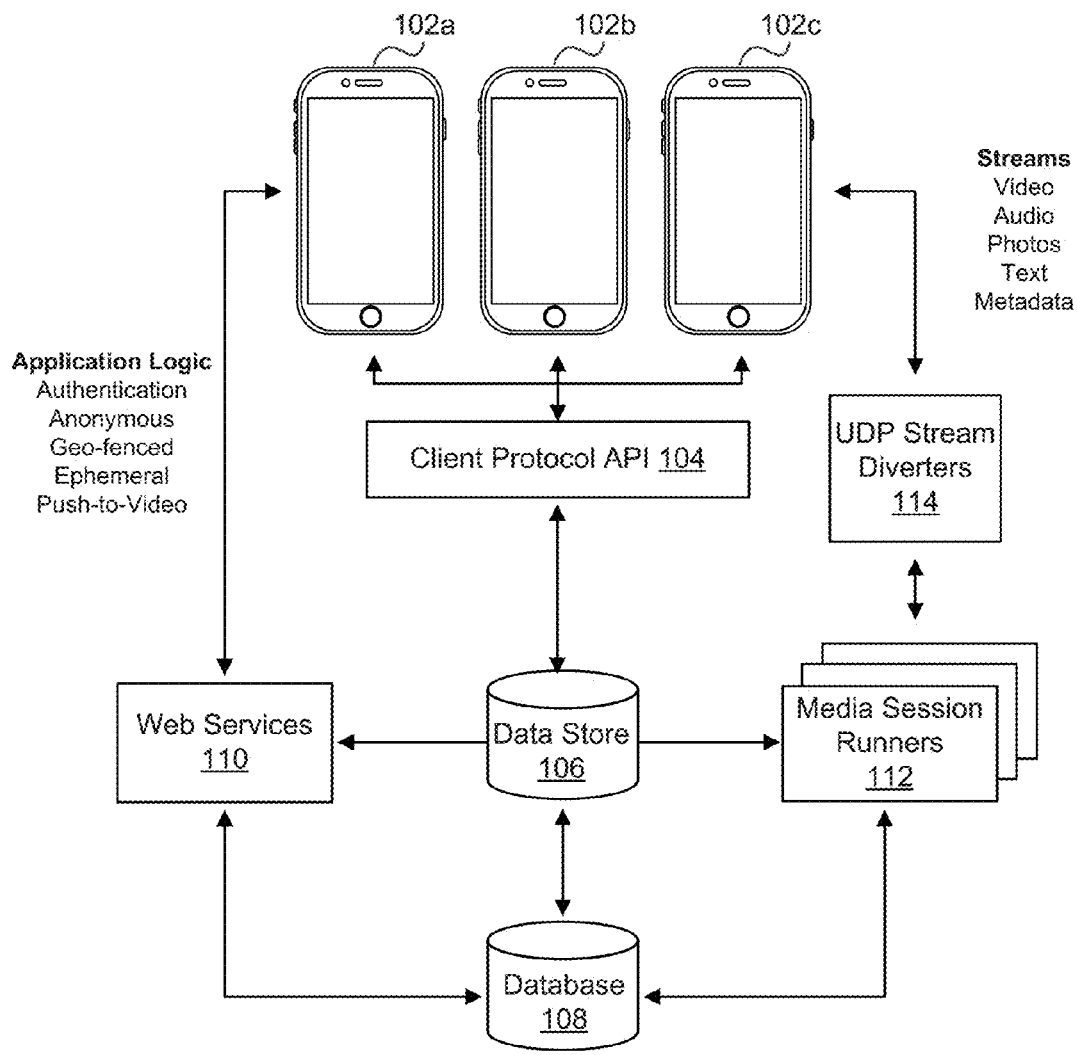
FIG. 1 is a generalized block diagram illustrating the architecture of a platform that facilitates interactions between a host user (in some cases a "celebrity") and one or more other participants (in some cases fans of the celebrity)

FIG. 1 is a generalized block diagram illustrating the architecture of a platform 100 that facilitates interactions between a popular individual (also referred to as a "celebrity") and one or more other individuals who have an interest in the celebrity. When the celebrity initiates an interactive session, the celebrity can be referred to as a "host" or "host user." Note, in some situations, the "host" or "host user" may refer instead to another individual that represents or is otherwise associated with the celebrity such as a manager, agent, publicist, sponsor, or family member. When the other individual(s) participate in an interactive session with the celebrity, they can be referred to as "audience members," "participants," or "participant users." The interactive session represents a forum through which a celebrity can establish a paced, synchronous session with one or more participant users. For example, each participant user may interact with the celebrity via an application that is executed by a corresponding user device 102a-c. "Users" of the platform 100 include both "host users" (e.g. celebrities, managers, agents, etc.) and participant users (e.g. audience members); therefore, each of the user devices 102a-c could be associated with either a host user or a participant user.

Here, for example, three user devices 102a-c are executing the application, which implements a client protocol application programming interface (API) 104. The client protocol API 104 monitors user interactions with the application to control distribution, publication, subscription, etc., of streams (e.g., of video, audio, photos, text, and/or metadata). For example, the client protocol API 104 may process inputs received at a user interface presented on the display of the user devices 102a-c.

The client protocol API 104 serves as an interface between the user devices 102a-c and a data store 106 (e.g., an in-memory data store, such as Redis). The data store 106, which supports certain utilities (e.g., the publish and subscribe commands or "pub/sub"), could store content required for initiating the streams, information relevant to the users (e.g., registration information or usage statistics), etc. In some embodiments, the data store 106 is connected to a database 108 that is responsible for storing metadata, media content (e.g., video and audio), etc. For example, the database 108 may include an archive of previously-recorded interactive sessions that can be replayed at the user devices 102a-c through the application. Moreover, the database 108 may be an open-source cross-platform document-oriented database, such as MongoDB. In such embodiments, the database 108 could use dynamic schemas and/or JavaScript Object Notation (or JSON-like) documents.

Logic in the application executing on each user device 102a-c can control user authentication. For example, the application may be synced with one or more social media accounts (e.g., Facebook®, Twitter®, Snapchat®) of the user (e.g., celebrity or audience member) corresponding to the user device. The application may also maintain user anonymity, provide geo-fencing, and implement the ephemeral nature of the content and push-to-video mechanism. Control information and/or other user information can then be provided to a web service 110, which is a collection of protocols or stands that are used to exchange data between the application and the data store 106/database 108. More specifically, the web service 110 can effect redistribution and publication/subscription in connection with the content of the database 108 and/or data store 106. The web service 110 could be, for example, Node.js, a JavaScript-based framework.

The user(s) are able to control and/or access various streams presented on the user interfaces generated by the application. The stream(s) can include video, audio, photos, text, and/or metadata, which are provided via media session runners 112 through User Datagram Protocol (UDP) stream diverters 114. These techniques allow stream control and access to be maintained as further described below.

The term "application" is used herein for the purposes of illustration only, and one skilled in the art will recognize that the user interfaces described herein could be accessible via one or more of a web browser, mobile application, software program, or an over-the-top (OTT) application. The user interfaces may be accessed using any appropriate network-accessible electronic device, such as a mobile phone, tablet, personal computer, game console (e.g., Sony PlayStation® or Microsoft Xbox®), music player (e.g., Apple iPod Touch®), wearable electronic device (e.g., a watch or fitness band), network-connected ("smart") device (e.g., television), virtual/augmented reality system (e.g., Oculus Rift® or Microsoft Hololens®), or some other electronic device.

The following classes of individuals could use the application to establish an interactive session with fans or followers:

Top-class Celebrities (e.g., those with millions of followers): These celebrities are often very conscious about their brand image and may only provide answers to pre-approved questions. Said another way, these celebrities may not take live questions or may only take live questions from participants that fit a specified selection criterion. According to an embodiment, an interactive session may proceed as follows:

The celebrity user sets a limit on the maximum number of fan questions allowed (e.g., a default value of 100) while scheduling a session;

One or more fans record question(s) (e.g., 15 second video recordings) for the celebrity and submit the question;

A service stores the questions on a server, which is typically only associated with that session;

The celebrity reviews the questions before the session and selects a few of them;

The server streams the questions, for example one by one, in the order chosen by celebrity, when the celebrity taps on a question button that is presented on the display of the celebrity's user device; and When the celebrity completes answering the question, the celebrity taps on the question button again for the next question.

Politicians, YouTube Personalities, Journalists, etc.: These individuals may prefer to initiate a instance session with their followers that supports live interactions. In such embodiments, a push-to-control video floor scheme can be used as further described below.

Note that top-class celebrities could also choose to participate in live interaction sessions, and other celebrities (e.g., politicians, YouTube personalities, journalists) could elect to participate in a session that includes pre-recorded and vetted questions.

Operating Environment—Example User Interface Features

Figure 2:
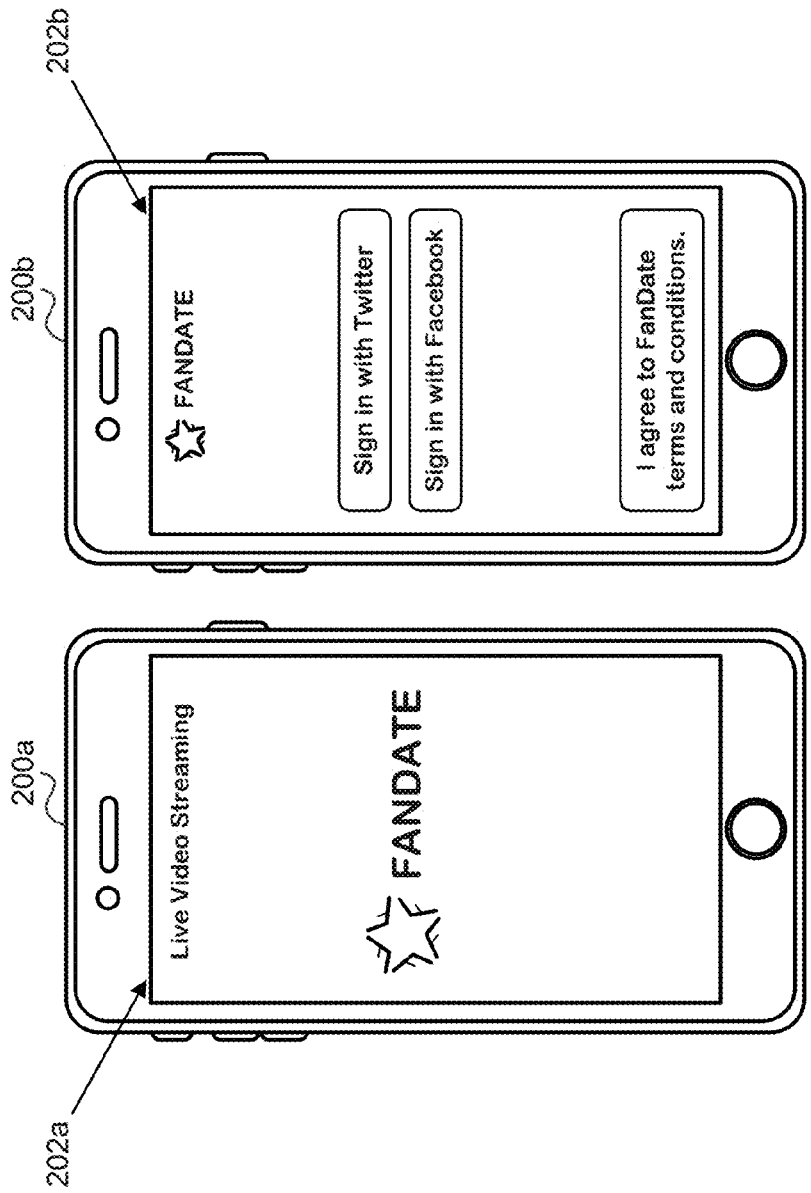
FIG. 2 includes screenshots of user interfaces that can be used to register with a service that facilitates paced, synchronous interactions between a host user and one or more other participants

FIG. 2 includes screenshots of user interfaces 202a-b that can be used to register with a service that facilitates paced, synchronous interactions between a host user (e.g. a celebrity) and one or more other participant users (e.g. audience members). The user interfaces 202a-b may be accessible to user devices 200a-b through a web browser, mobile application, software program, or an OTT application.

In some embodiments, a user registers for the service (also referred to as "FanDate™") by signing into to a social media account (e.g., Facebook, Twitter, Snapchat). The term "user" can refer to any individual (e.g., a celebrity or a prospective audience member) who accesses the application. Such an action may link the user's account with the service to a particular social media account. Consequently, the user may not need to complete a tedious registration process in order to initiate the application and participate in interactive sessions. Instead, user information could be pulled from the social media account. For example, the underlying platform 100 could extract the user's name, location, a count of the user's fans or followers, other social media presences associated with the user, etc.

In other embodiments, the service may require the user to manually complete a registration form or simply confirm that information extracted from a social media account is indeed correct. For example, the user may elect to associate an account with a particular social media account, and then the service may request additional information.

Figure 3A:
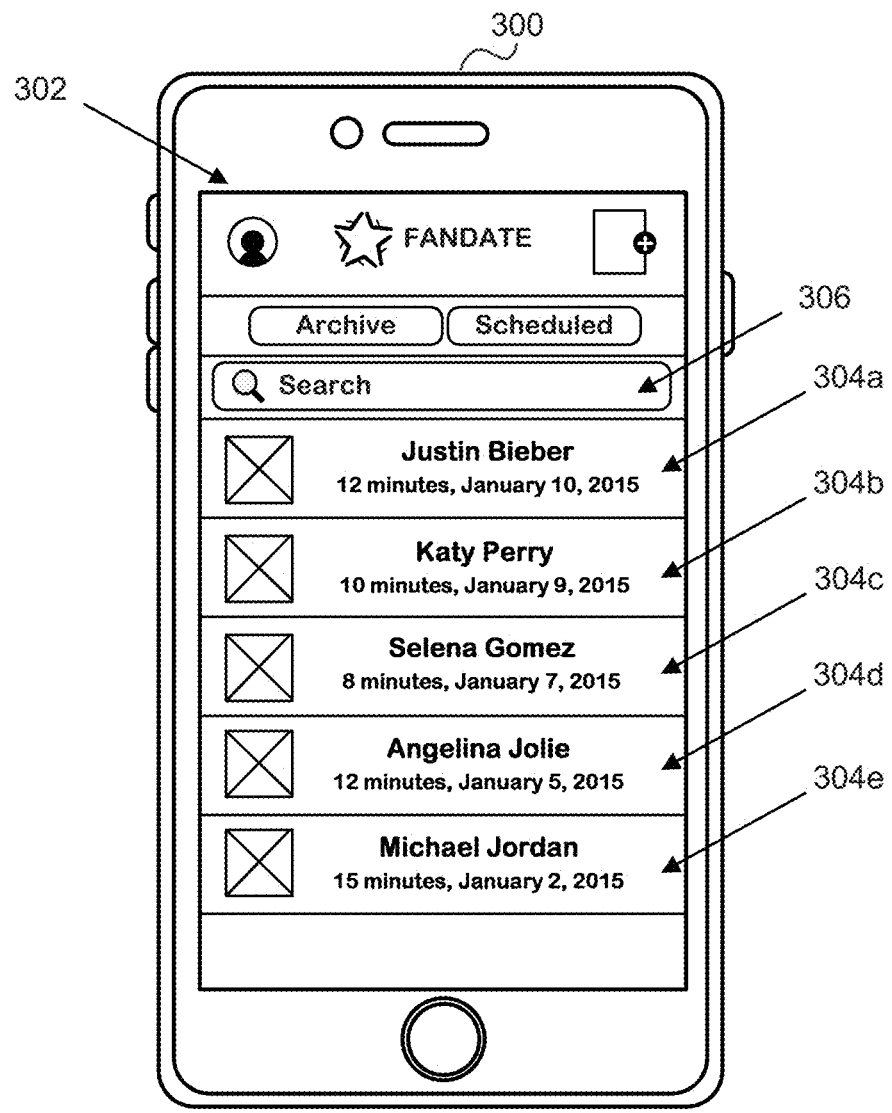
FIG. 3A shows an example user interface that includes a list of pending and/or in progress interactive sessions.

FIG. 3A shows an example user interface 302 that includes a list of pending and/or in progress sessions 304a-e to be facilitated by the platform 100. Each of the sessions is a paced, synchronous interaction between a host user such as a celebrity (here, Justin Bieber, Katy Perry, etc.) and one or more participant users (i.e. audience members). Each participant user interacts with the host user via a user interface that is presented on the display of a corresponding user device 300 (e.g., a mobile phone, tablet, or personal computer).

The list of sessions may be searchable by various criteria. For example, a prospective participant user may be able to search for the name of a particular celebrity or a keyword (e.g., "sports," "music") that is associated with individual sessions by entering these terms within a search bar 306. The participant user could also filter the sessions by recording date, session duration, etc. In some embodiments, participant users are able to browse archived sessions and/or scheduled sessions.

Figure 3B:
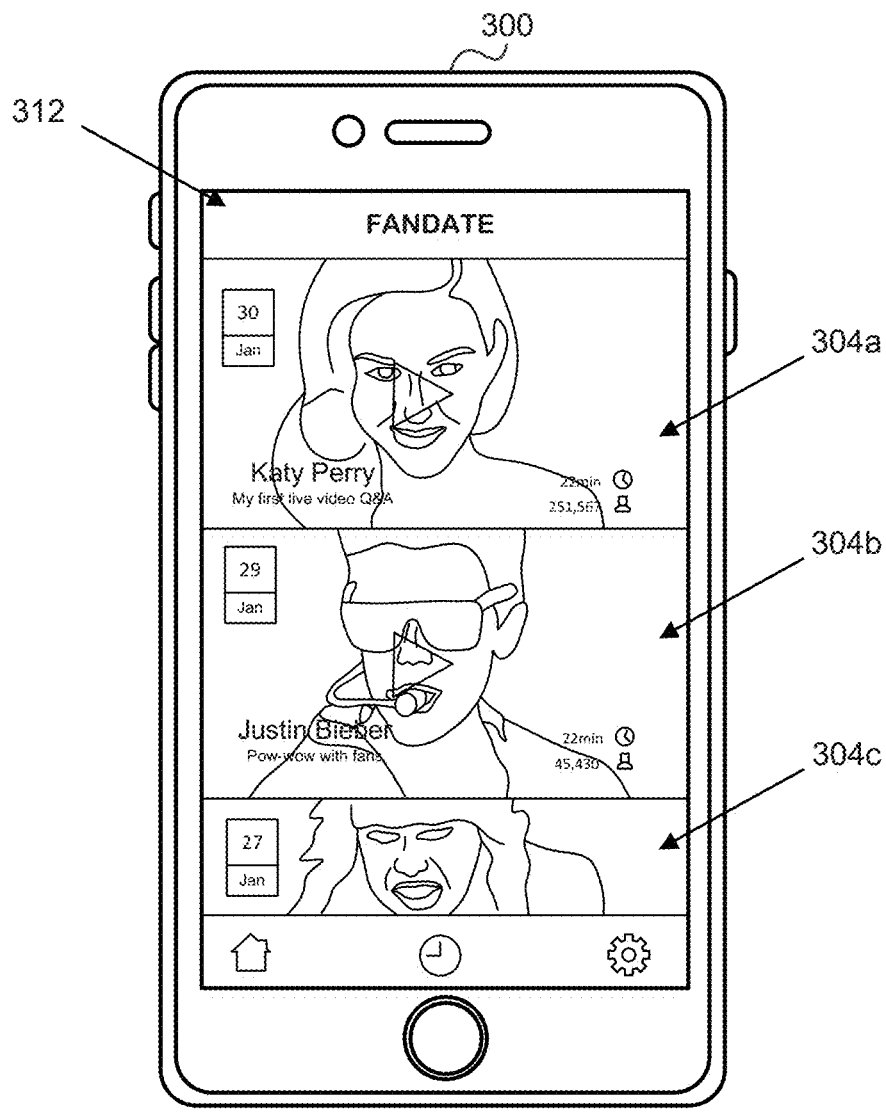
FIG. 3B shows an example user interface that includes multiple pending and/or in progress interactive sessions displayed as multiple graphical elements.

FIG. 3B shows an example user interface 312 that is similar to interface 302 except that the included list of pending and/or in progress sessions are displayed as multiple graphical elements 304a-c. As with interface 302 shown in FIG. 3A, each of the sessions by the platform 100. Each of the sessions is a paced, synchronous interaction between a host user such as a celebrity (here, Justin Bieber, Katy Perry, etc.) and one or more participant users. Each of the graphical elements 304a-c can include an image and/or video of the celebrity hosting the interactive session, information regarding the session (e.g. scheduled start, number of participants, title, category of discussion, etc.). A prospective participant user can select to join one of the interactive sessions by, for example, interacting with (e.g. touching) one of the corresponding graphical element 304a-c.

Figure 3C:
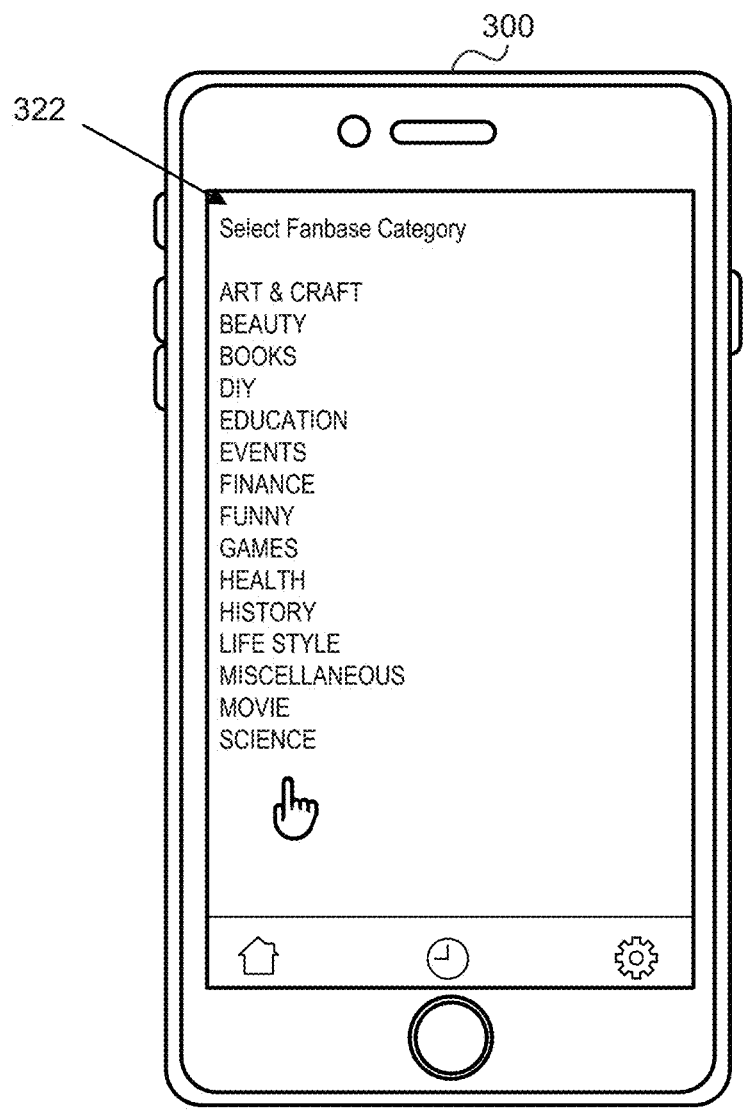
FIG. 3C shows an example user interface including a list of categories of pending and/or in progress interactive sessions.

FIG. 3C shows an example user interface 322 showing a list of categories of pending and/or in progress sessions to be facilitated by the platform 100. In an embodiment, a participant user can select one or more of the available categories (e.g. art & craft, beauty, books, etc.). In response to a user selection, a participant user may be presented with an interface (e.g. interface 302 of FIG. 3A or interface 312 of FIG. 3B) including a list of pending and/or in progress sessions that fit the selected category. For example, in an embodiment, the user-selectable categories pertain to a topic of discussion set up for the various pending and/or in progress sessions.

Figure 3D:
FIG. 3D shows an example user interface for joining an interactive session already in progress.

FIG. 3D shows an example user interface 332 showing interactive graphical element 334 prompting a user to join an interactive session hosted by a celebrity (e.g. Oprah Winfrey) that is already in progress. For example, a user may select a particular session (e.g. via interface 302 of FIG. 3A or interface 312 of FIG. 3B). If the user selected session is currently in progress, the user may be presented with graphical interface 334 prompting the user to join the session already in progress. In response to selecting yes, the user may be placed into the session already in progress as an audience member.

Figure 4A:
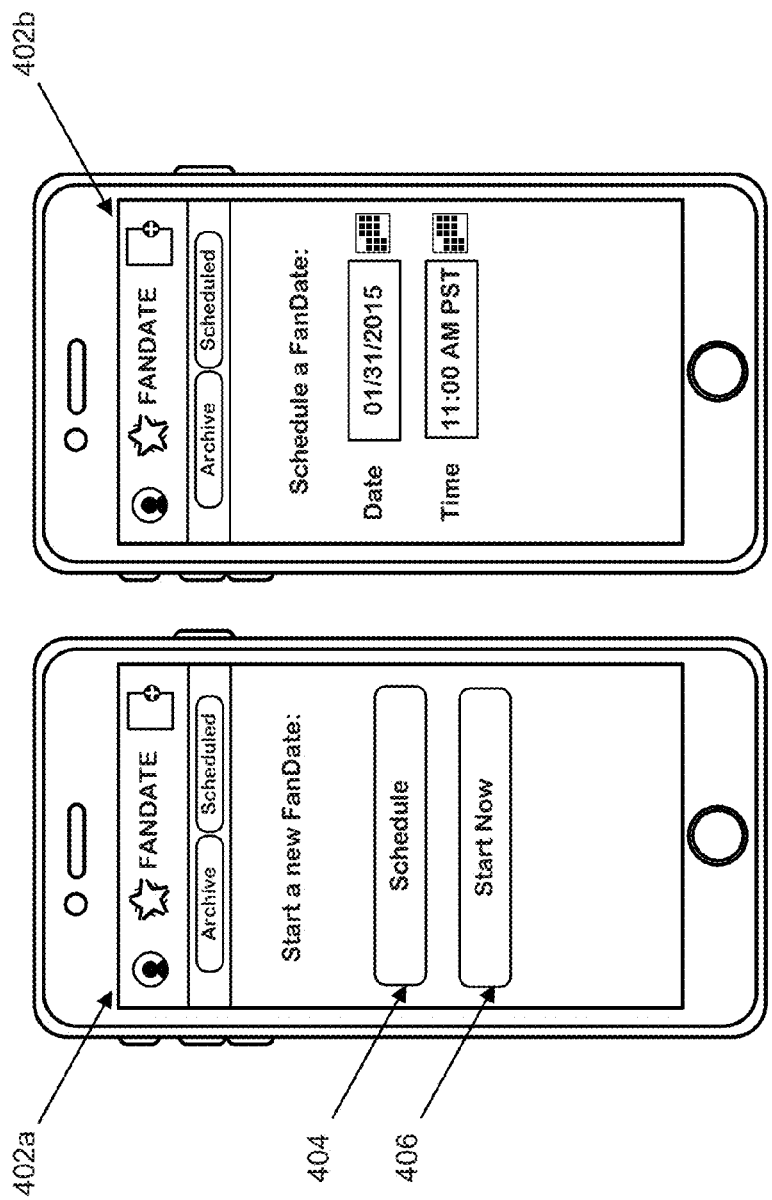
FIG. 4A shows example user interfaces for creating an interactive session.

FIG. 4A shows example user interfaces 402a-b that can be used by a host user (e.g. a celebrity) to create an interactive session. For example, a host user may be able to schedule a session for a later time by selecting a schedule button 404 and then specifying a date and/or time. A scheduled session can then be added to the host user's calendar and/or the calendar of some other individual (e.g., a secretary or manager) associated with the user. In some embodiments, a host user must be a celebrity or represent a celebrity to qualify to initiate an interactive session. The qualification of a host user to initiate an interactive session may be based at least in part on a level of notoriety of the user. For example, the platform 100 may require that the user have minimum number (e.g. 100,000 or 1,000,000) of followers or fans on a social media platform (e.g., Twitter followers or Facebook fans) to qualify as a celebrity and be granted permission to initiate an interactive session.

Figure 5:
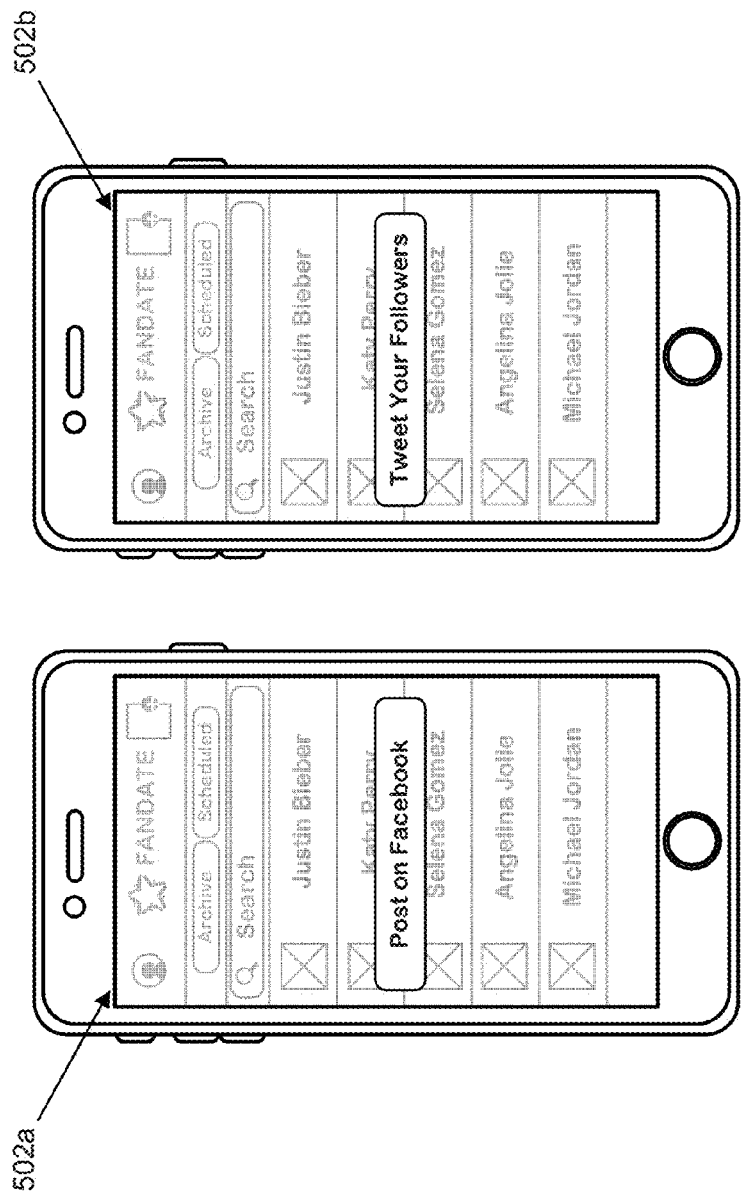
FIG. 5 shows example user interfaces for logging into other social media accounts.

In order to establish a given user's qualification as a celebrity, that user may link his or her platform 100 account with their corresponding accounts at one or more other social media platforms (e.g. Twitter, Facebook, et.). FIG. 2, for example, includes screenshots of a user interface 202*b* through which a user can sign into their platform 100 account using login information for another social media account (e.g. Twitter, Facebook, etc.). In response to login into the platform 100 account (e.g. via interfaces 202*a-b*) with login info from a third-party social media platform, the platform 100 account may be linked with the account with the third-party social media platform, thereby providing access to certain information regarding the user (e.g. number of followers/fans) managed at the social media platform. Alternatively or in addition, a user already logged into their platform 100 account may directly log into another social media account directly from the user interface. For example, FIG. 5 shows interfaces 502*a-b* through which a user can log into other social media accounts (e.g. Twitter, Facebook, etc.) from within an interface of the platform 100.

In some embodiments, scheduled sessions are activated before the scheduled session start time. For example, sessions could be activated 10 or 15 minutes before the scheduled start time. Once a session has been activated, audience members may be permitted to interact with (e.g., tap or click) a link and access the session through the application.

The host user can also elect to commence an interactive session immediately by selecting a start now button 406. The host user may answer questions as they are submitted by one or more participant users (i.e. audience members), answer a predetermined set of questions, or simply record media content without any audience participation (e.g., a statement or performance). The celebrity may also be able to specify whether an interactive session is recorded and presented in real time or whether the interactive session is recorded and stored by the platform 100 for subsequent viewing.

Figure 4B:
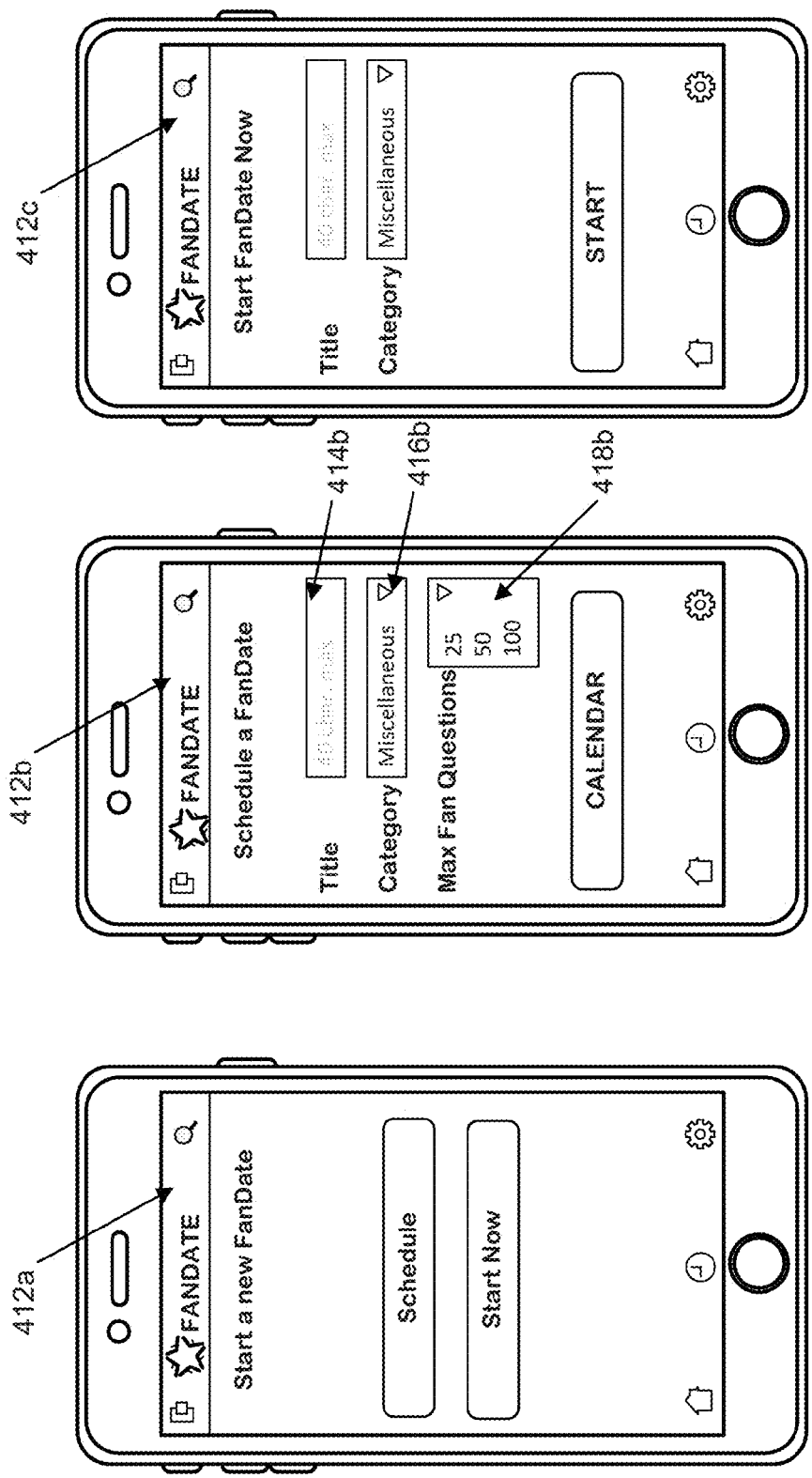
FIG. 4B shows example user interfaces for creating an interactive session that include user-selectable options for the interactive session.

FIG. 4B shows example user interfaces 412*a-c* for creating an interactive session that include user-selectable options for the interactive session. As shown in FIG. 4B, interfaces 412*a-c* can include user-selectable options (e.g. in the form of text fields, pull down menus, etc.) through which a host user (e.g. a celebrity) can select options for the interactive session. For example, interface 412*b* includes a text field 414*b* in which a host user can enter a title for the interactive session, a pull down menu 416*b* through which a host user can select from different pre-defined categories under which to list the interactive session, and a pull down menu 418*b* through which a host user can set a maximum number of fan questions to take during the interactive session. The example options 414*b*, 416*b*, and 418*b* in interface 412*b* are provided for illustrative purposes and should not be construed as limiting. For example, as will be described, a host user may enter participant selection criteria through similar interfaces to facilitate selecting users from which to take questions or comments during the interactive session.

Figure 4C:
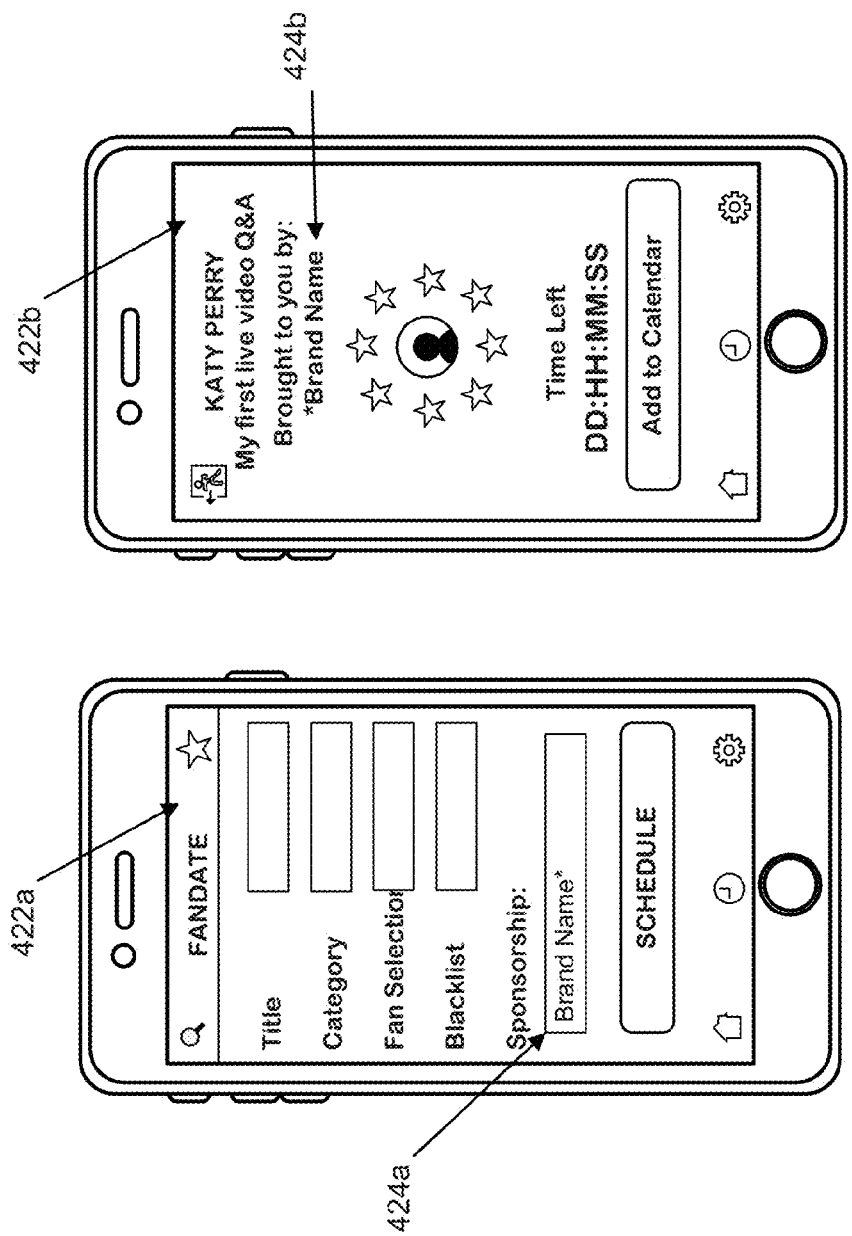
FIG. 4C shows example user interfaces for setting up sponsorship for an interactive session.

FIG. 4C shows example user interfaces 422*a-c* for setting up sponsorship for an interactive session. Similar to the user-selectable options 414*b*, 416*b*, and 418*b* in interface 412*b* of FIG. 4B, interface 422*a* can include a user-selectable option 424*a* for setting up sponsorship of an interactive session. For illustrative purposes, option 424*a* is shown in interface 422*a* as a text field for through which a user can enter a brand name. However in other embodiments, option 424*a* may include other input mechanism such as a list of pre-defined sponsors from which a user can select (e.g. via a drop down menu), an option to upload media (e.g. an image or video associated with the sponsor, an option to link to a social media account associated with the sponsor, etc. After the host user (e.g. a celebrity) has set up the interactive session with a sponsor via interface 422*a*, interface 422*b* may display information about the scheduled or in-progress interactive session that includes sponsorship information 424*b*. Again, for illustrative purposes, sponsorship information 424*b* is shown in interface 422*b* as text string reading "Brought to you by: *Brand Name," however in other embodiments, sponsorship information 424 may include images, video, links, interactive elements, etc.

FIG. 5 shows example user interfaces 502*a-b* that illustrate how a host user (e.g. a celebrity) may readily log into a social media account directly from the user interface. When the host user has linked an account with one or more social media accounts, any interactive sessions that are scheduled by the host user may be announced across the corresponding social media channel(s). For example, an announcement of an upcoming interactive session may be automatically announced to the followers/fans of a celebrity via the celebrity's Facebook account, Twitter account, etc.

Figure 6:
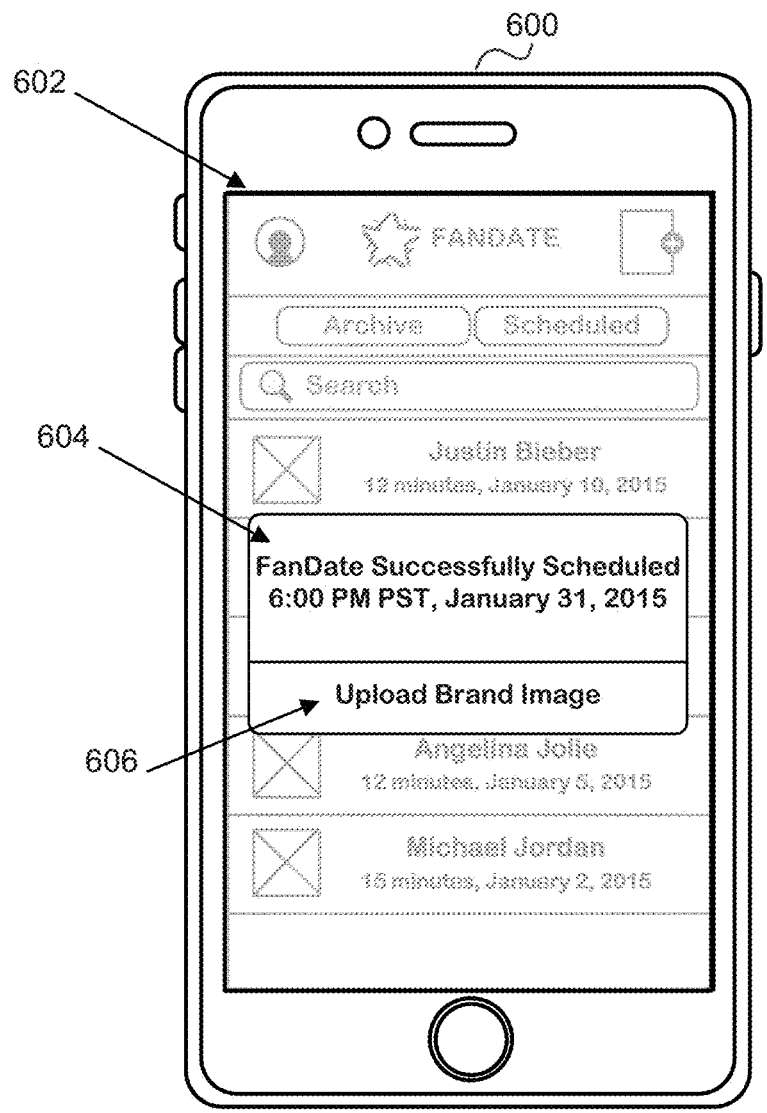
FIG. 6 shows an example user interface for announcing that an interactive session has been successfully scheduled.

FIG. 6 shows an example user interface 602 that includes a notification 604 announcing an interactive session has been successfully scheduled. In some embodiments, the a host user (e.g. a celebrity or someone associated with the celebrity, such as a manager, publicist, or family member) can upload a brand image, marketing information, etc., via an interface element 606 included in the notification. The host user may also be able to announce the interactive session by pushing the notification out through one or more social media channels. For example, the host user may choose to announce the interactive session to the celebrity's Facebook fans, Twitter followers, etc.

In some embodiments, the notification automatically disappears after a predetermined interval of time has elapsed (e.g., five seconds) or if the user taps on the display of the user device 600 on which the notification is presented. In other embodiments, the application requires the host user confirm the interactive session by interacting with a particular element of the user interface (e.g., a confirmation button).

FIGS. 7A-E include screenshots of example user interfaces that depict various stages of an interactive session between a host user (e.g. a celebrity) and one or more participant users. A session initially begins with a start screen 702. During the broadcasting interval, the host user may be able to stop video and/or mute audio at any time. In some embodiments, the host user is also able to take questions from audience members (i.e., "open the floor" to an audience member) by tapping on a Q&A button 704.

Figure 7A:
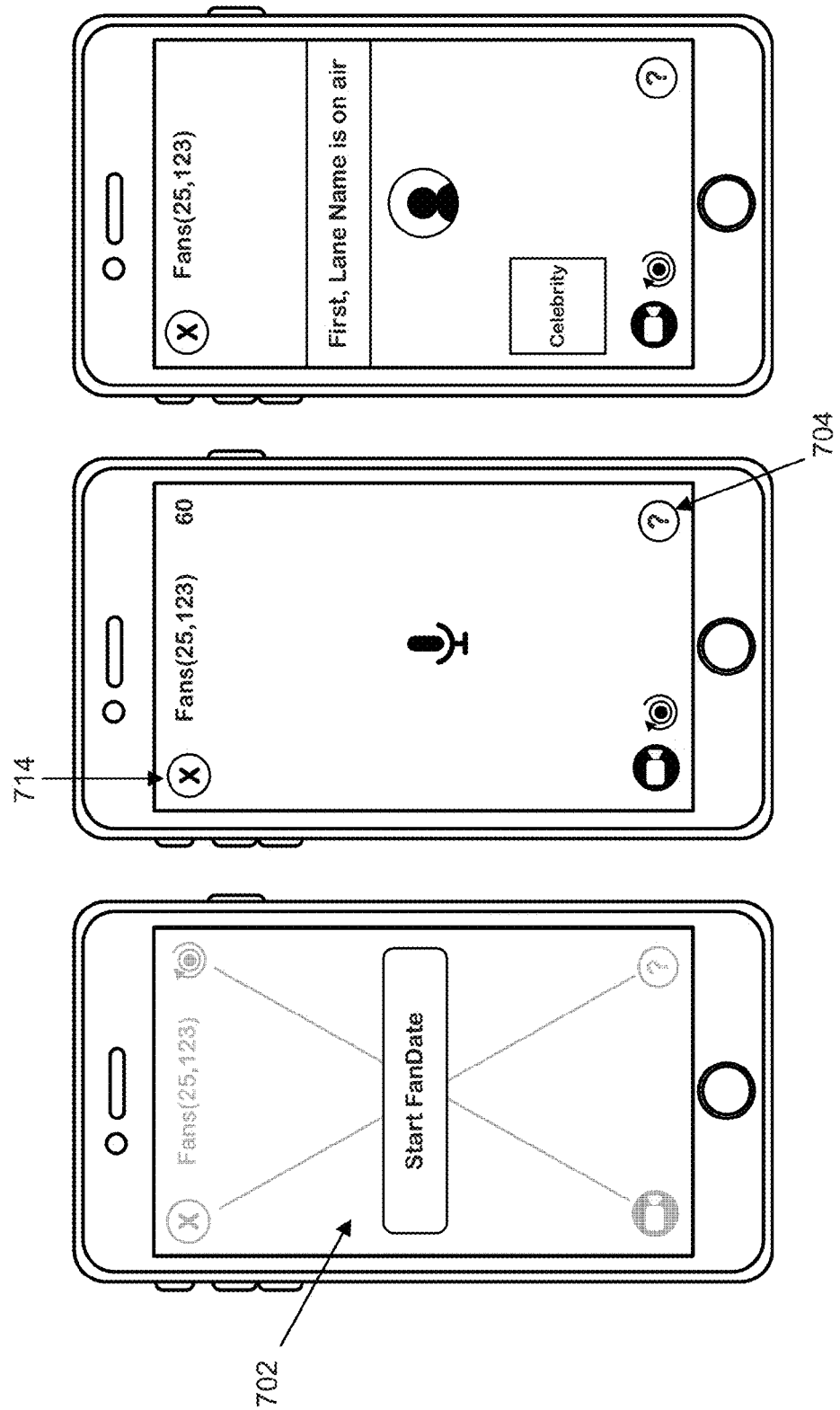
FIGS. 7A-7E show example user interfaces that depict various stages of an interactive session.
Figure 7B:
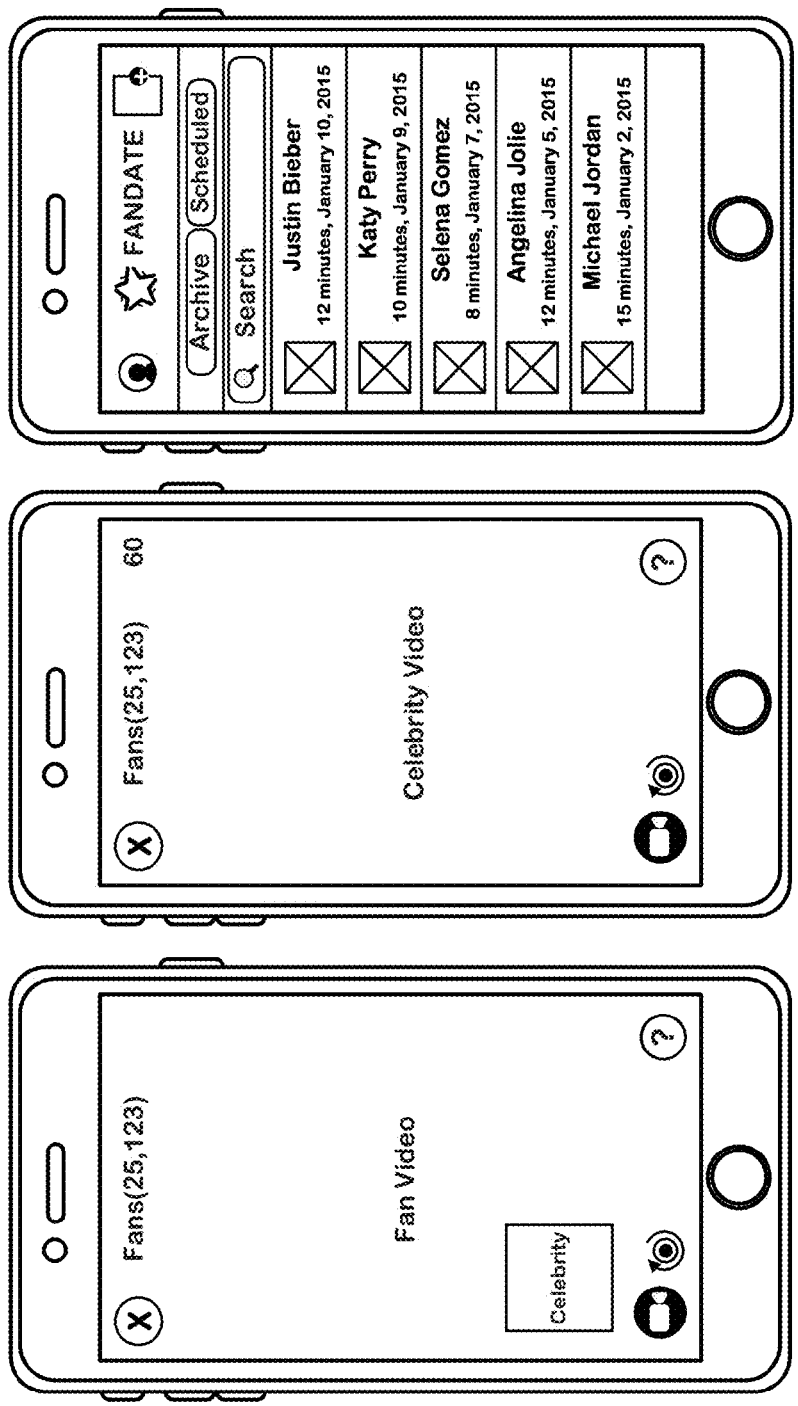
Figure 7C:
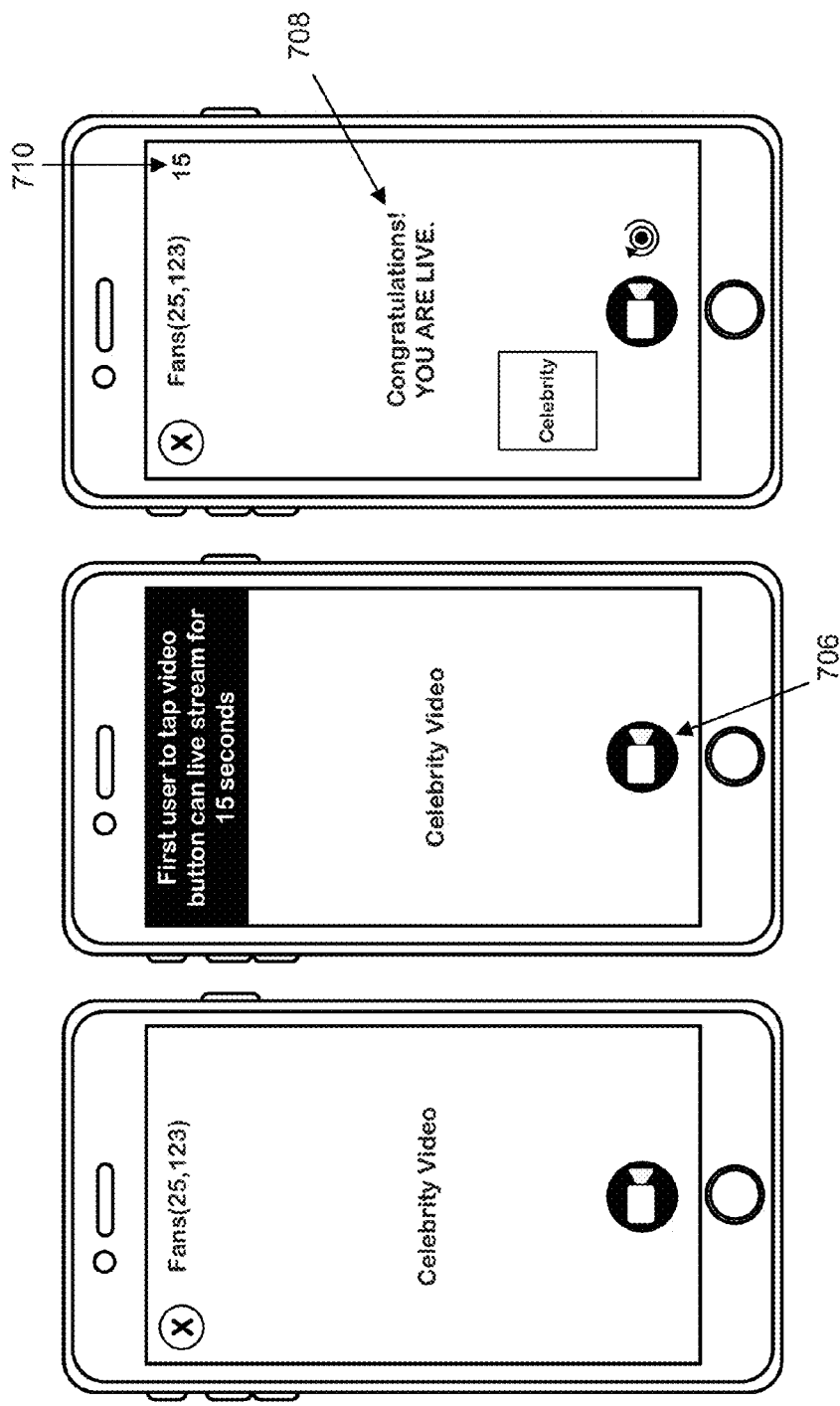

As shown in FIG. 7C, a video button 706 can be displayed to some or all of the participant users that allows those users to transmit a media stream during the interactive session. For example, the video button 706 may be presented to a predetermined number of participant users (e.g., the first ten to enter the session) or a subset of the participant users who satisfy certain selection criterion (e.g., have an uplink speed of at least 500 Kbps or a certain number of social media fans).

Figure 7D:
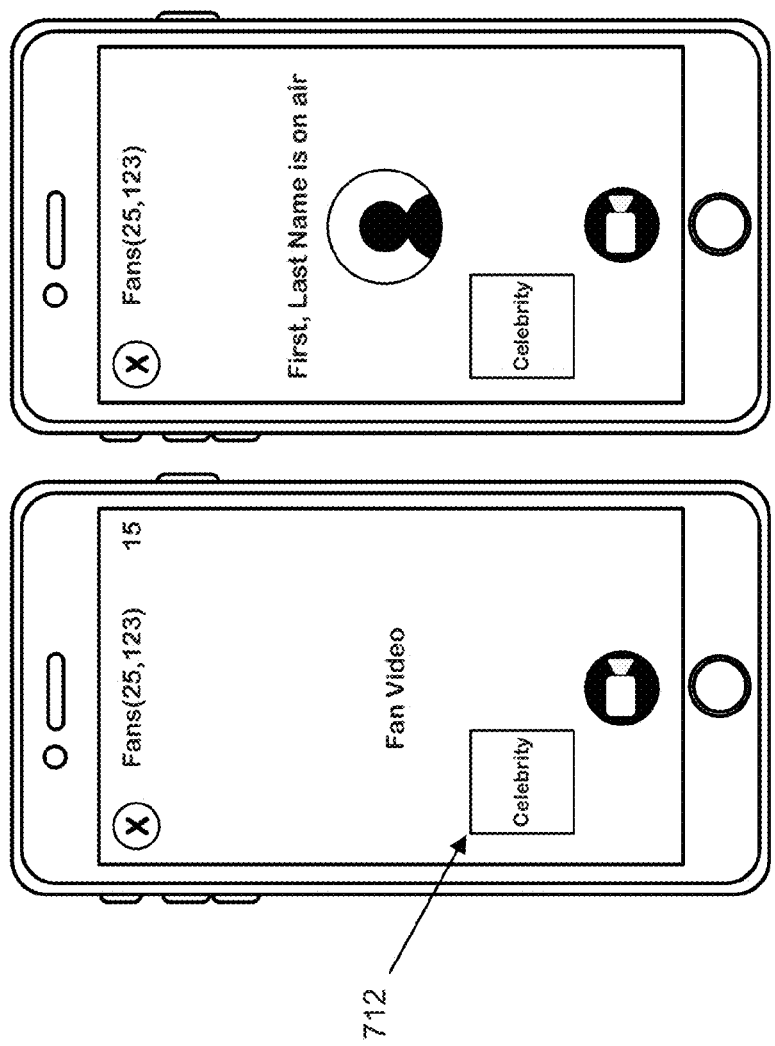
Figure 7E:
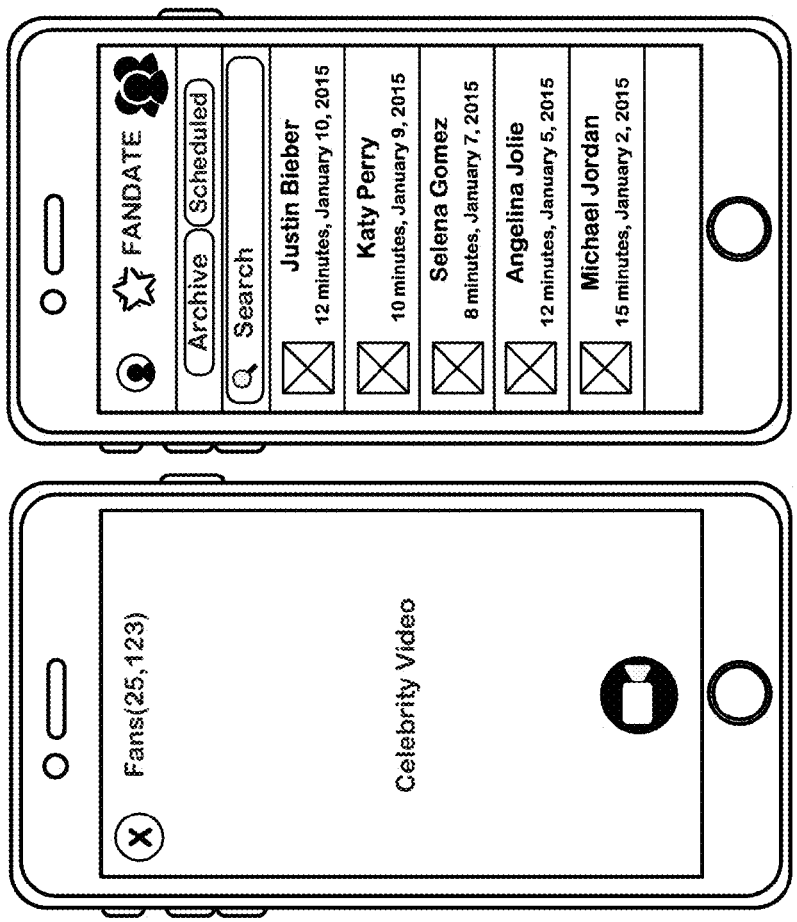

This may be necessary to provide a high quality user experience, as well as keep mischief mongers with fake social media accounts from asking inappropriate questions. The first participant user to tap on the video button 706 could be announced to all other participant users in the session by displaying the selected user's profile picture and name for a few seconds (as shown by FIG. 7D) or by audibly announcing the selected participant user's name. In some embodiments, the host user and/or an administrator associated with the service who is responsible for managing the application are able to terminate the participant user's media stream at any time.

As shown in FIG. 7C, a selected particular participant user may be able to stream media to the host user and the other participant users. After tapping the video button 706, a notification 708 can be presented that indicates the particular participant user's video/audio feed is now live. The session could can also stream the media content and display a countdown 710 (e.g., downward from 15 seconds) that advises the selected particular participant user of the floor time remaining.

After the particular participant user's broadcast times out or is terminated (e.g., by the participant user, host user, or an administrator user), the floor button 712 is activated and the host user's media stream is once again displayed. For example, the celebrity video may be automatically brought back to full screen on each participant's display when no participant users are uttering questions (i.e., when the host user "has the floor"). The host user can then continue the session by tapping on the Q&A button 704 or end the session by tapping on the close button 714.

As shown by in FIGS. 7C-D, an individual participant user's perspective generally consists mainly of the host user's media stream unless another participant user is streaming media to the session (e.g. asking a question, submitting a comment, etc.). In some embodiments, those participant users who are eligible to ask questions (and thus record themselves in real time) are visually notified on the display (e.g., by a blinking video button that appears on the display).

When an particular participant user is selected (e.g., by being the first to push the video button), the particular participant user will have the floor for a predetermined amount of time. The amount of time may be based on the expected length of the session, the length of the question submitted, or could simply be a specified amount (e.g., 10 or 15 seconds). After the amount of time expires, the media stream is ended and the user interface may automatically revert to a different layout. In some embodiments, the selected participant user, host user, and/or an administrator may be able to prematurely terminate the media stream.

A splash screen can also be displayed to selected participant user that indicates the participant user is able to ask a question. Moreover, when a particular participant user has the floor, that participant user may be granted video and/or audio control. For example, the participant user may be able to stream a live video feed or record an utterance without streaming video. The host user's media stream will typically continue to be streamed (e.g., within another window shown by the user interface). Consequently, other participant user's may simultaneously hear and/or see the particular participant user asking a question as well as the host user. Said another way, the media streams during an interactive session may be full duplex.

Figure 8:
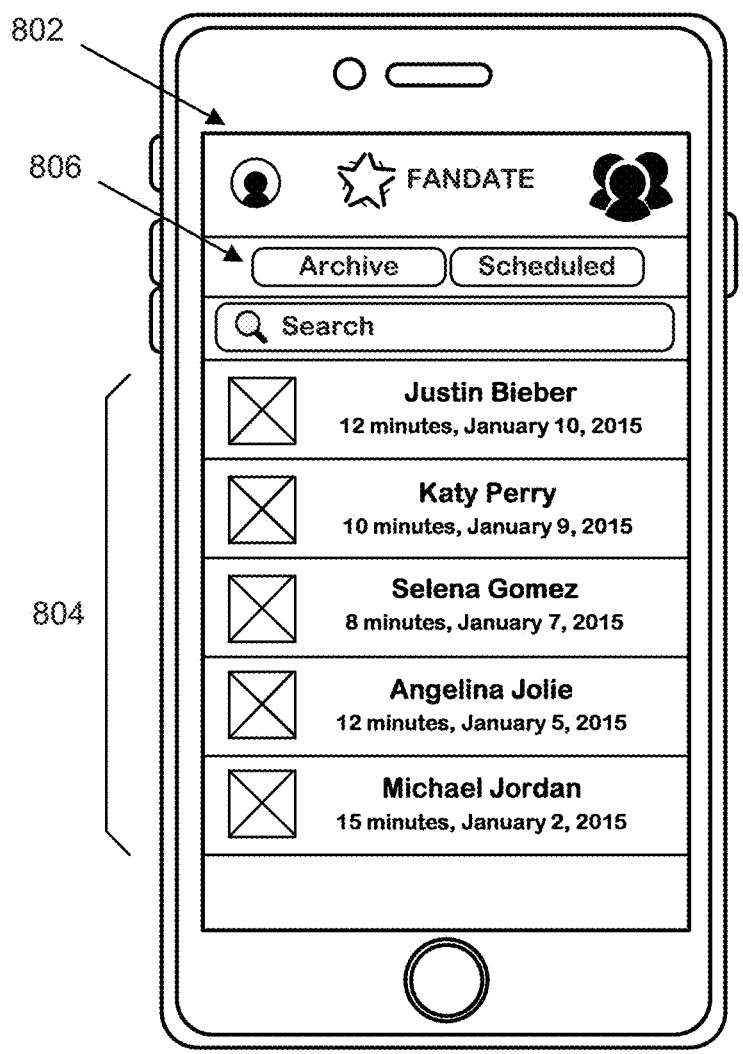
FIG. 8 shows an example user interface including an archive of past interactive sessions.

FIG. 8 shows an example user interface 802 showing an archive of interactive sessions 804. The interactive sessions 804 could include sessions in which questions were asked by participant users in real time, sessions in which pre-screened questions were read by a host user, or sessions in which pre-recorded questions were streamed. Sessions in the archive may be replayed by through the application as desired.

The interactive sessions can also be raw (i.e., unedited) recordings or processed (i.e., edited) recordings in which inappropriate questions, gaps of silence, etc., have been removed. Other media content (e.g., digital images and audio files, such as music or sound effects) could also be added to processed recordings that are stored in the archive. As shown in FIG. 8, the archive may be readily accessible by tapping on an archive button 806 that is presented on some or all of the user interfaces within the application.

Figure 9:
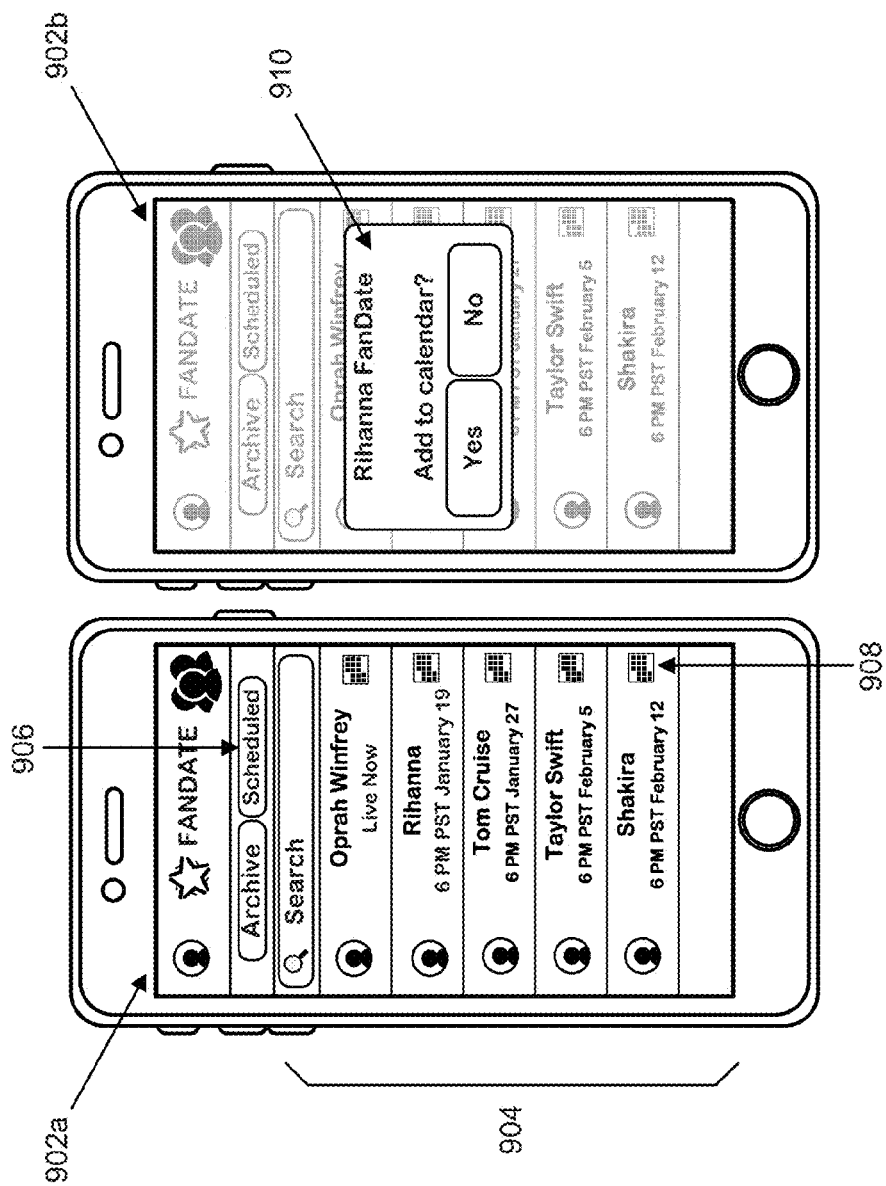
FIG. 9 shows example interfaces for adding add scheduled interactive sessions to an calendar.

FIG. 9 shows example user interfaces 902*a-b* that can be used to easily add scheduled sessions to an audience member's calendar. More specifically, a list of scheduled sessions 904 can be shown to the audience member upon selection of a scheduled button 906. The scheduled button 806 may be presented on some or all of the user interfaces accessible through the application.

A calendar icon 908 may be displayed for each session that allows audience members to easily add the scheduled sessions to a calendar program or application (e.g., Google Calendar, Microsoft Outlook, Apple iCloud Calendar). In some embodiments, a notification 910 may be presented upon selection of the calendar icon 908 that prompts a user to confirm whether the scheduled session should be added to a calendar. The notification 810 may also allow the user to select which calendar program or application should be used, send information about the scheduled session to another potential audience member (e.g., via text message, email, or social media), etc.

Figure 10:
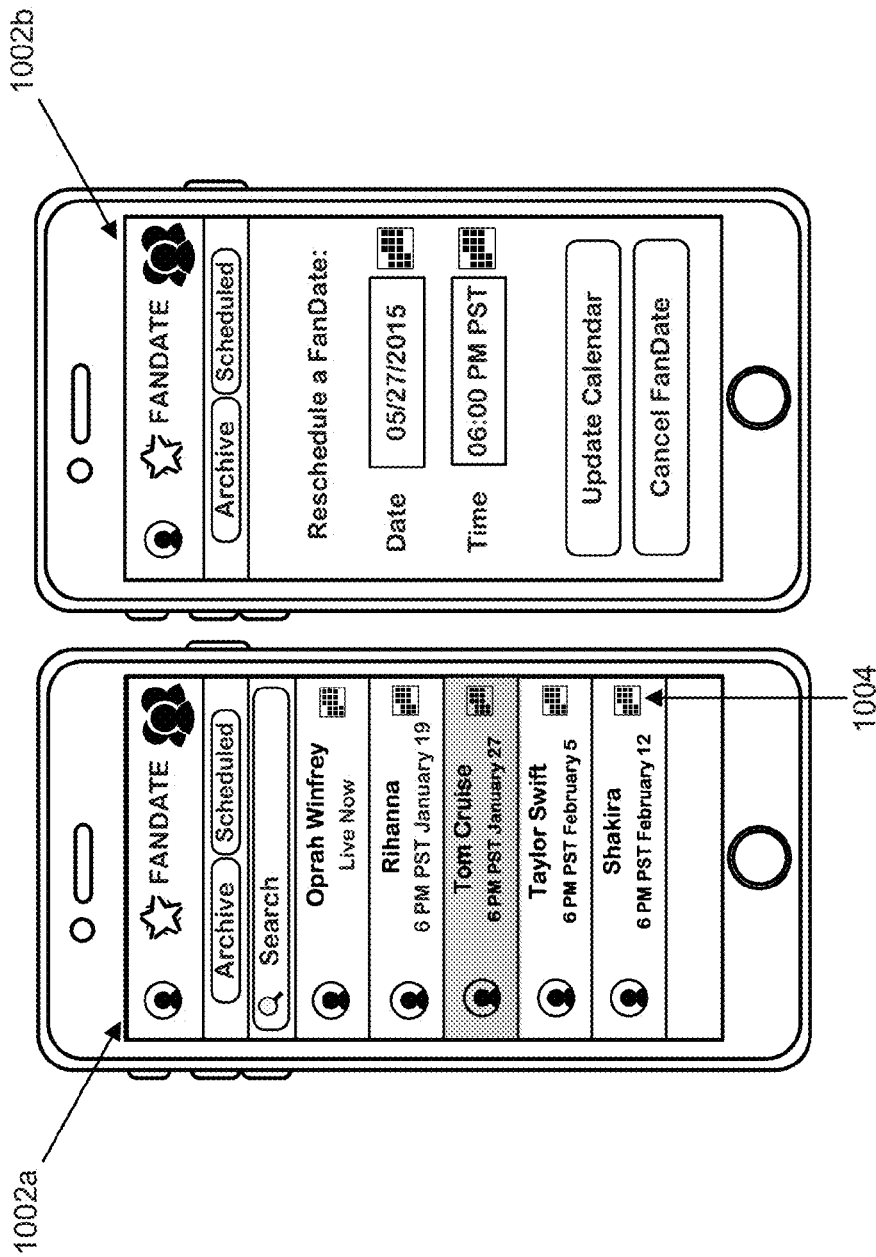
FIG. 10 shows example user interfaces for rescheduling an interactive session.

FIG. 10 shows example user interfaces 1002*a-b* that can be used to reschedule an interactive session through the application. More specifically, the application may allow the a host user (e.g. a celebrity) and/or an administrator to readily reschedule an interactive session by clicking a calendar icon 904.

In some embodiments, potential participant users are also able to request that an interactive session be moved by selecting a desired time. If a sufficient number of potential participant users request that the session be moved (e.g., a predetermined percentage of all social media fans or confirmed attendees), the host user and/or the administrator may have additional motivation to move the session to a different date/time.

In such scenarios, the host user can access the session schedule and set a new date and/or time for the session. A notice of the new date/time could be broadcast to all fans of a celebrity (e.g., through social media) or only those fans who have indicated an interest in attending the session (e.g., through the application). The notice can be transmitted via text message, email message, push notification, social media, etc. In some embodiments, the fans are able to specify (e.g., via a preferences menu accessible through the application) which communication channel should be used.

Participant Selection Mechanism—Example General Processes

As mentioned, the previously described platform 100 and various interface features provide for an effective communications mechanism through which celebrities can connect with their fans. Described herein are various participant selection mechanisms that enable a host user of an interactive session to select or screen the participants from which they will interact with during the interactive session. As will be described in more detail, these participant pre-filtering mechanisms can include, but are not limited to pre-filtering, pre-selection, pre-recording, geo-targeting, and blacklisting.

Figure 11A:
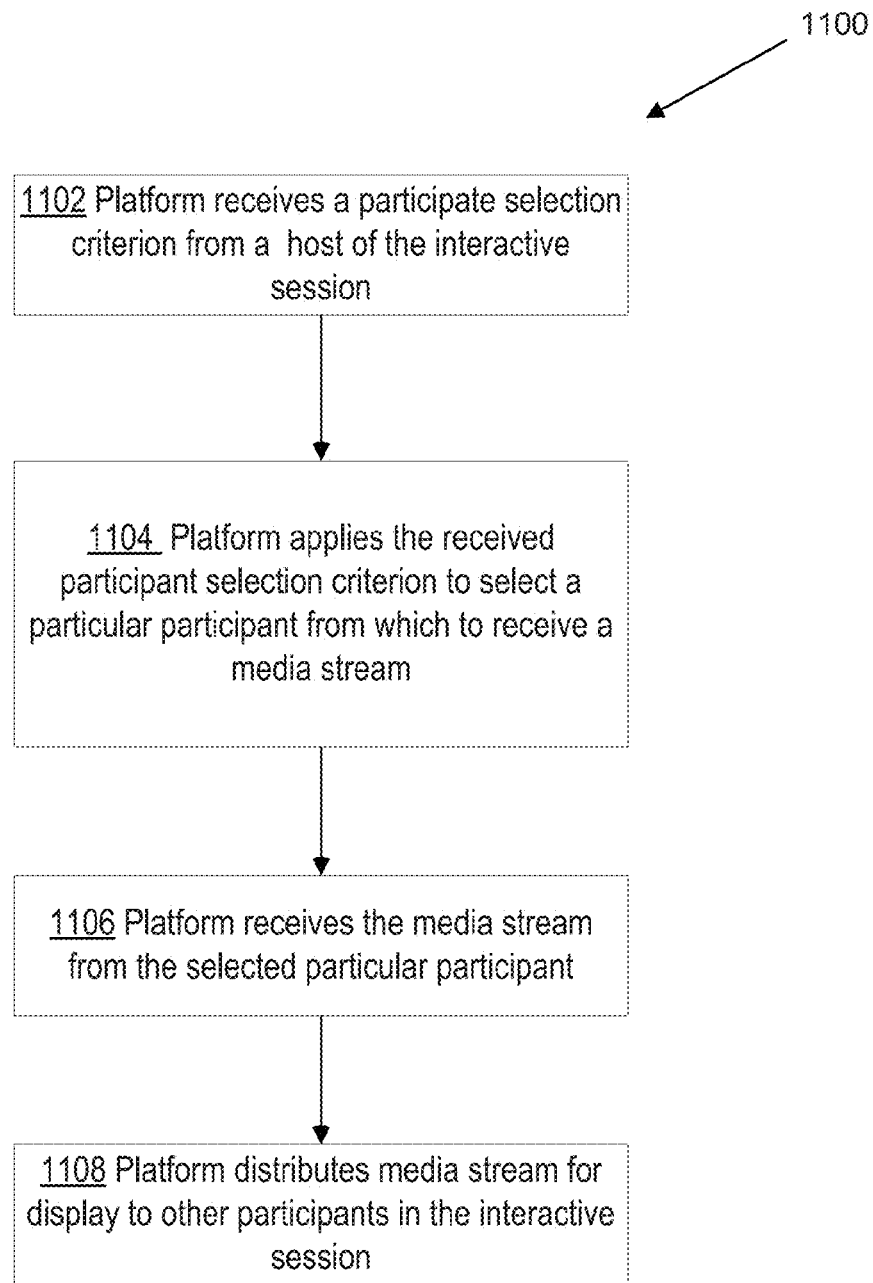
FIG. 11A a flow chart of an example process for selecting a participant for interaction with a host during an interactive session.

FIG. 11A is a flow chart of an example process 1100 for selecting a participant user for interaction during an interactive session with a host user (e.g. a celebrity). Interaction in this context may refer to receiving or broadcasting a media stream (e.g. a video question) from the selected participant user, for example as described with respect to FIGS. 7A-7E. In some embodiments, process 1000 can be performed by one or more computer systems operating as part of the platform 100 for facilitating a paced, synchronous interactive session.

Figure 12:
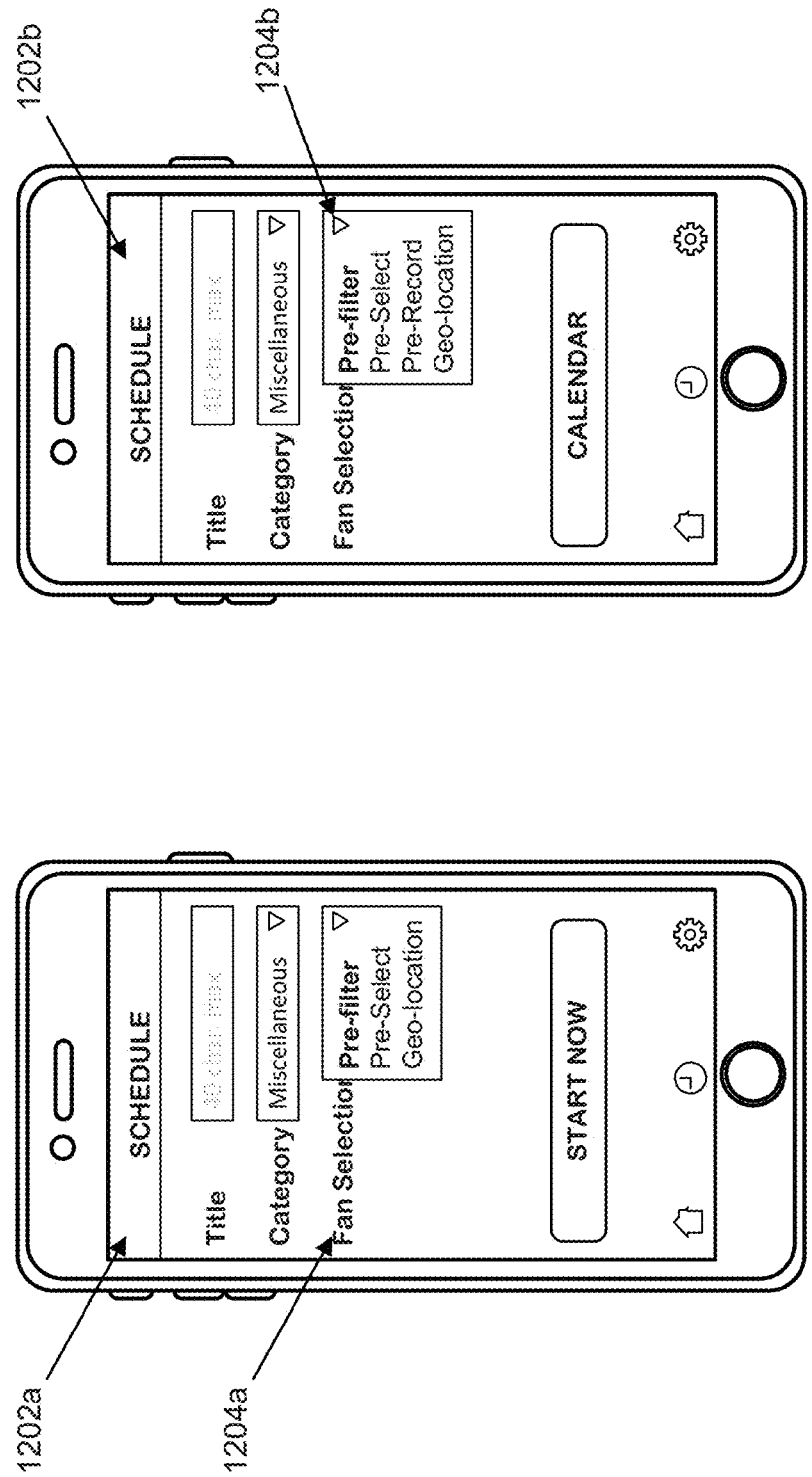
FIG. 12 shows example user interfaces for defining a participant selection criteria.

At step 1102, platform 100 receives participant selection criterion (or criteria) from a host user of the interactive session, such as a celebrity. As previously mentioned, a participant selection criterion can include, but is not limited to pre-filtering, pre-selection, pre-recording, geo-targeting, and blacklisting. In some embodiments, the participant selection criterion is received as part of a request by the host to initiate an interactive session. As previously described, platform 100 may generate a user interface accessible via a user device (e.g. an application at a mobile device) through which a host can initiate an interactive session. Further, such a user interface may include interactive elements through which a user can define the participant selection criterion before initiating the interactive session. FIG. 12 shows example user interfaces 1202a-b through which a user can provide input to define one or more participant selection criteria. For example, example interfaces 1202a-b include user-selectable options 1204a-b in the form of pull down menus through which a user may select one or more categories of participant selection criteria (pre-filtering, preselect, etc.) to apply to a given interactive session.

At step 1004, the platform applies a received participant selection criterion (e.g. as defined based on inputs received via interfaces 1202a-b) to select a particular participant from which to receive a media stream during an interactive session. As mentioned, the media stream may be received from a computing device associated with the participant that is connected to the interactive session. The media stream can include live and/or pre-recorded media and may include any of images, audio, video, text, metadata, etc. The ways in which various types of participant selection criteria are applied will be described in more detail later. At step 1106 the platform receives the media stream from the selected particular participant and at step 1108, the platform cases distributes the media stream received from the particular participant to the other participants in the interactive session for display via their respective devices, for example as described with respect to FIGS. 7A-7E.

Figure 11B:
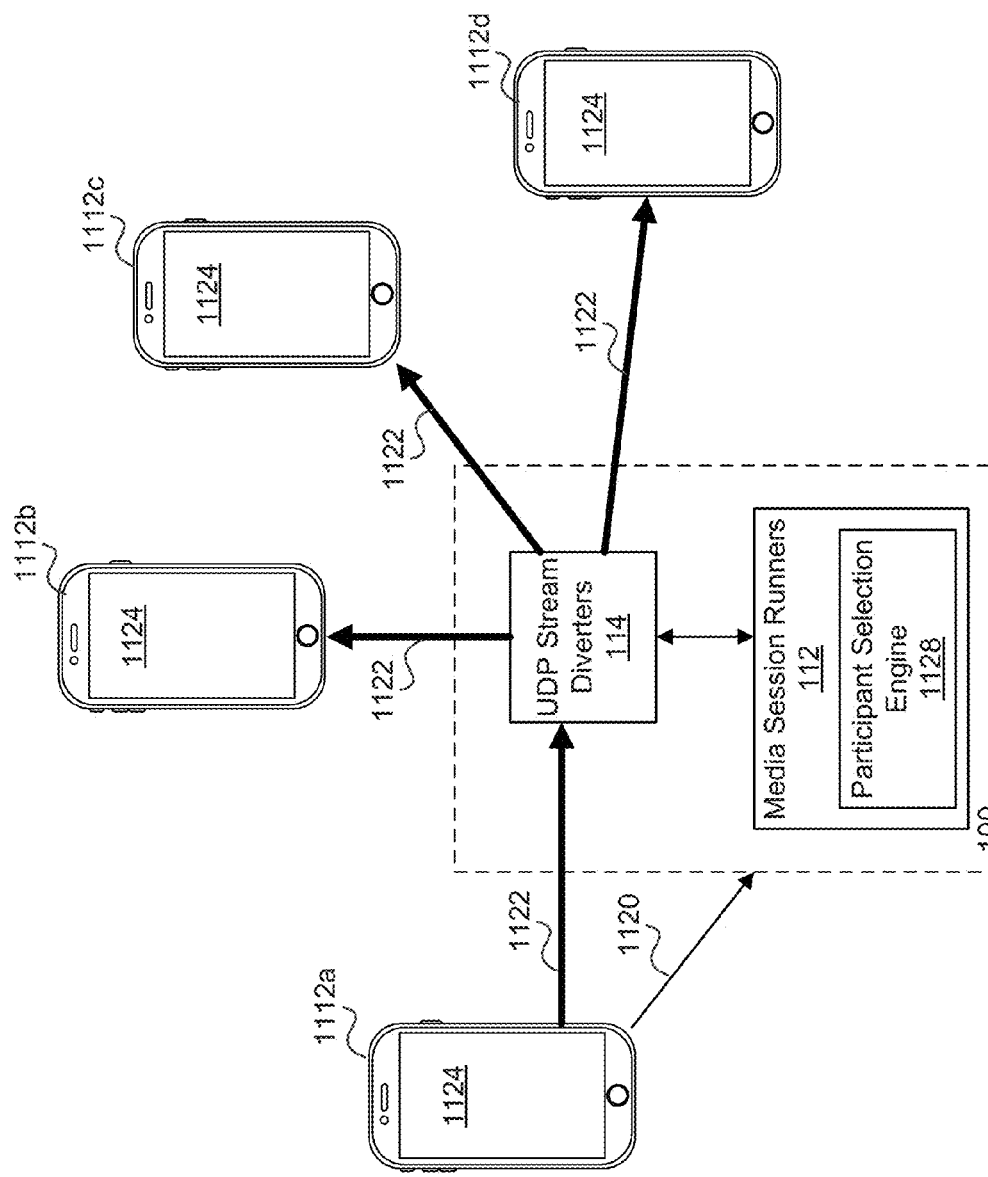
FIGS. 11B-11D show a sequence of architectural flow diagrams that illustrate an example process for selecting a participant for interaction with a host during an interactive session.
Figure 11C:
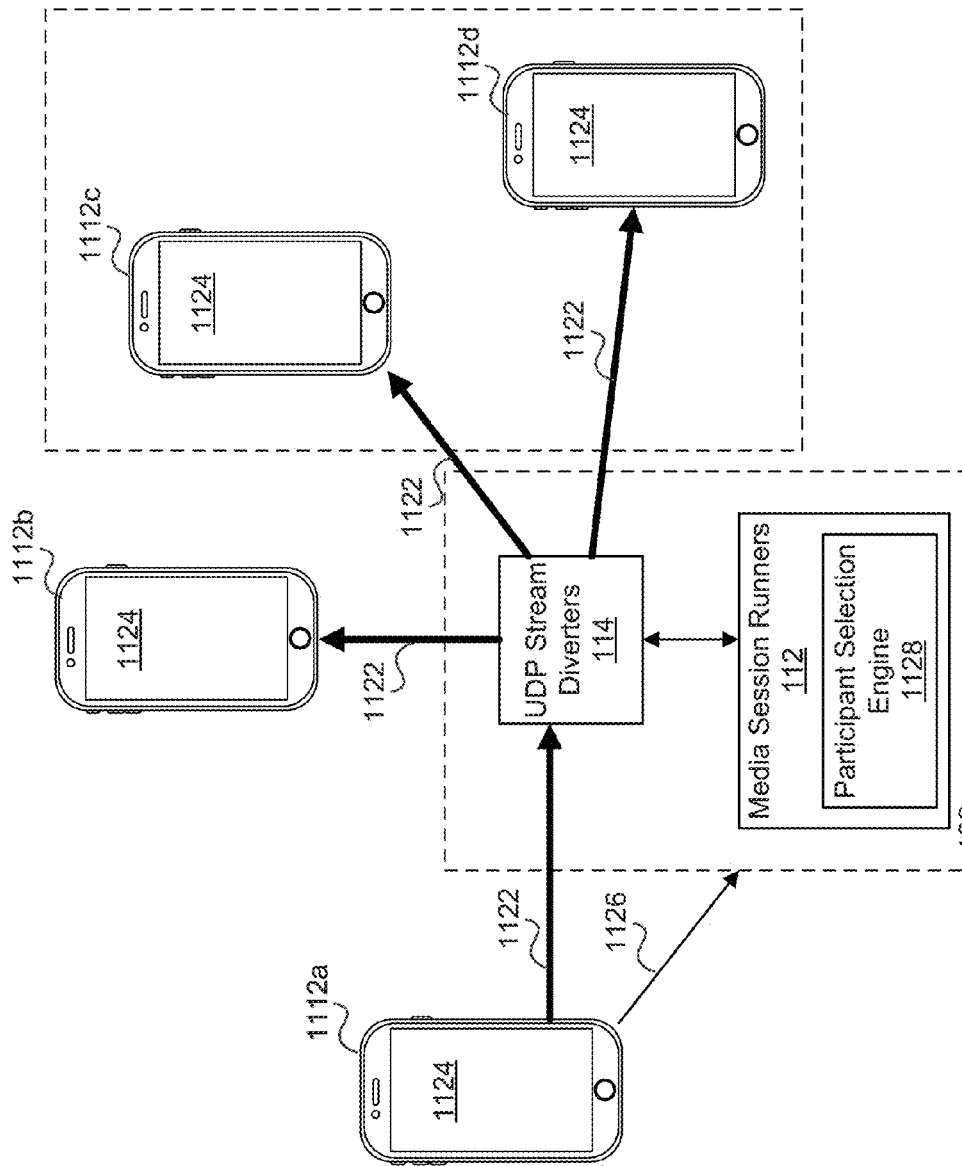
Figure 11D:
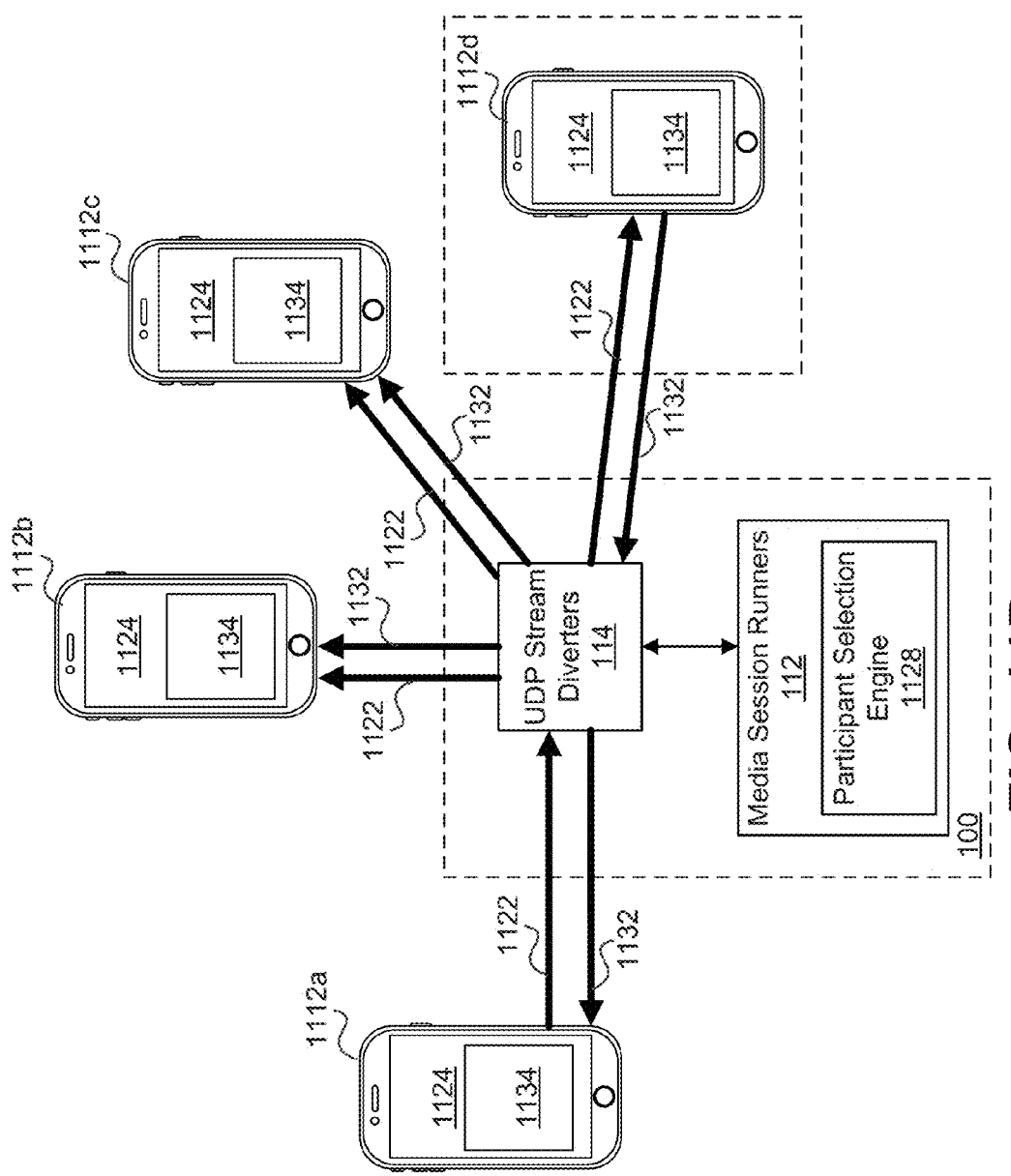

FIGS. 11B-11D show a sequence of architectural flow diagrams that further illustrate a process for selecting a participant user for interaction during a paced, synchronous interactive session. As shown in FIG. 11B, a host device 1112a may transmit a request 1120 to platform 100 to initiate an interactive session with multiple participant device 1112b-d. Note that devices 1112a-d may be similar to devices 102a-c described with respect to FIG. 1. Further platform 100 shown in FIG, 11B may be the same as platform 100 described with respect to FIG. 1, but may not show certain components for clarity. In an embodiment, the request 1120 transmitted at step includes a participant selection criterion, for example as described previously with respect to FIG. 11A.

In response to receiving the request 1120 from host device 1112a, platform 100 may initiate the interactive session between the host device 112a and the multiple participant devices 112b-d. In an embodiment the interactive session may include a first communication channel enabling a media stream 1122 from the host device 1112a to the multiple participant devices 1112b-d. In embodiment, this communication channel remains open enabling streaming from the host device 1112a to the multiple participant devices 1112b-d for the duration of the interactive session. As previously described the media stream 1122 can include video, audio, photos, text, and/or metadata. The communication channel may be provided via media session runners 112 through User Datagram Protocol (UDP) stream diverters 114. As used herein, the term communication channel can refer to any type of communicative connection over a computer network. For example, the communication channel may represent a logical connection between host device 1112a and participant devices 1112b-d over one or more physical media across one or more multiplexed networks. Note, that as shown in FIG. 11B, and according to some embodiments, media stream 1122 is represented as a one way stream of media data from the host device 1112a to participant devices 1112b-d. For example, in an embodiment, UDP Stream diverter 114 can receive media stream 1122 in the form of live video captured at host device 1112a, replicate the media stream 1122 as necessary, and effectively broadcast media stream 1122 to the multiple participant devices 1112b-d connected to the interactive session via platform 100. At this stage, participant devices 1112b-d are not enable to broadcast their own media streams to the host device or to other participant devices. For example, platform 100 may cause devices 1112a-d to display media stream 1112 as output 1124. For example, in the case of streamed live video, output 1124 could include live video of a celebrity captured at host device 1112a. In other words, as shown in FIG. 11B, the users of the participant devices 1112b-d are audience members viewing the media stream 1122 from the user of the host device 1112a (e.g. the celebrity). At this stage in the session, These audience members have limited or no ability to interact with the celebrity using the host device or with other participants.

As shown in FIG. 11C, at any point during the interactive session, a host device 1112a may transmit a request 1126 to platform 100 to open the session to audience participation. For example, as previously described with respect to FIGS. 7A-E, during an interactive session, a celebrity may take questions from audience members (i.e., "open the floor" to particular participant users) (e.g. by tapping on a Q&A 704 in interface 7A). In other words, the request by the host device is a request to open the interactive session to a second media stream from one of the multiple participant devices 1112b-1112d. In response to receiving the request, platform 100 applies the participant selection criterion to select one of the participant devices from which to receive the second media stream. For example, in some embodiments, application of the participant selection criterion may be performed by a participant selection engine 1128 that is part of or in communication with the media session runner 112 for the particular session, as shown in FIGS. 11B-11D.

Application of specific types of participant selection criteria (e.g. pre-filter, geo-targeting, etc.) is described in more detail below. However, the process of selecting a participant from which to receive a media stream can take a few general forms. In some embodiments, depending on the selection criterion applied, a single participant device (e.g. device 1112d) may be automatically selected. In such embodiments, when a celebrity presses Q&A button 704 at an interface of host device 1112a, platform 100 automatically selects and initiates a second media stream from a particular participant device, without any additional input from the celebrity user of the host device 1112a or the participant user of the selected participant device. In some embodiments, instead of automatically selecting a participant device, platform 100 selects or identifies a subset of the connected participant device that qualify for selection based on the participant selection criterion. For example, as shown in FIG. 11C, a participant selection engine 1128 has identified a subset of the connected participant devices that qualify based on an applied selection criterion, as illustrated by the dotted line surrounding devices 1112c and 1112d. Once a subset of qualified devices is identified, a particular device from the subset may be selected using a number of methods. For example, in some embodiments, the subset is presented to a host user at the host device 1112a with a prompt to input a selection of the one of the devices from which to receive the second media stream. Alternatively, in some embodiments, a selection process similar to as described with respect to FIGS. 7A-7E is applied, in which a prompt is presented at each of the qualified participant devices (e.g. 1112c and 1112d) to initiate a media stream. The first qualified device from which a request is received is then selected to transmit a media stream. This can be accomplished by, for example, including a platform synchronized timestamp in each request and comparing the timestamps of received requests to determine the first device to request.

In response to selecting the particular participant device, platform 100 can open a second communication channel enabling the second media stream from the selected particular participant device for a limited period of time during the interactive session. For example, as shown in FIG. 11D, a second communication channel has been opened enabling a media stream 1132 from selected (as indicated by the surrounding dotted line) device 1112d. Similar to media stream 1122, media stream 1132 can include video, audio, photos, text, and/or metadata. The second communication channel may be provided via media session runners 112 through User Datagram Protocol (UDP) stream diverters 114. Also similar to media stream 1122, and according to some embodiments, media stream 1132 is represented in FIG. 11D as a one way stream of media data from the selected particular participant device 1112d to host device 1112a and the other participant devices 1112b-c. For example, in an embodiment, UDP Stream diverter 114 can receive media stream 1132 in the form of live video captured at device 1112d, replicate the media stream 1132 as necessary, and effectively broadcast media stream 1132 to the host device 1112a and other participant devices 1112b-c connected to the interactive session via platform 100.

Stream 1122 from the host device 1112a may persist for the duration of the interactive session. Accordingly, the concurrent streams 1122 and 1132 are synchronized for simultaneous presentation at the multiple device 1112a-d. For example, as shown in FIG. 11D, platform 100 may cause devices 1112a-d to display media stream 1112 as output 1124 and media stream 1132 as output 1134. For example, in the case of streamed live video, output 1124 could include live video of a celebrity captured at host device 1112a and output 1134 could include live video of a fan captured at the selected participant device 1112d. Output 1134 is presented as a frame within output 1124 at each device 1112a-d, however it shall be appreciated that the way in which the multiple streams 1122 and 1132 are presented may dynamically change and may be different at each device. For example, as described with respect to FIGS. 7A-7E, when a participant is given the floor to ask a question of the celebrity, the output of their stream (e.g. stream 1132) may be maximized relative to the output of the stream (e.g. stream 1122) from the host device. Once the participant has finished asking their question and/or their stream has terminated, the output of the host stream 1122 may revert to a maximized state. Further, users at each device may be provided options to customize how the various streams are presented (e.g. options to resize and reposition windows).

Participant Selection Mechanism—Pre-Filtering

Figure 13:
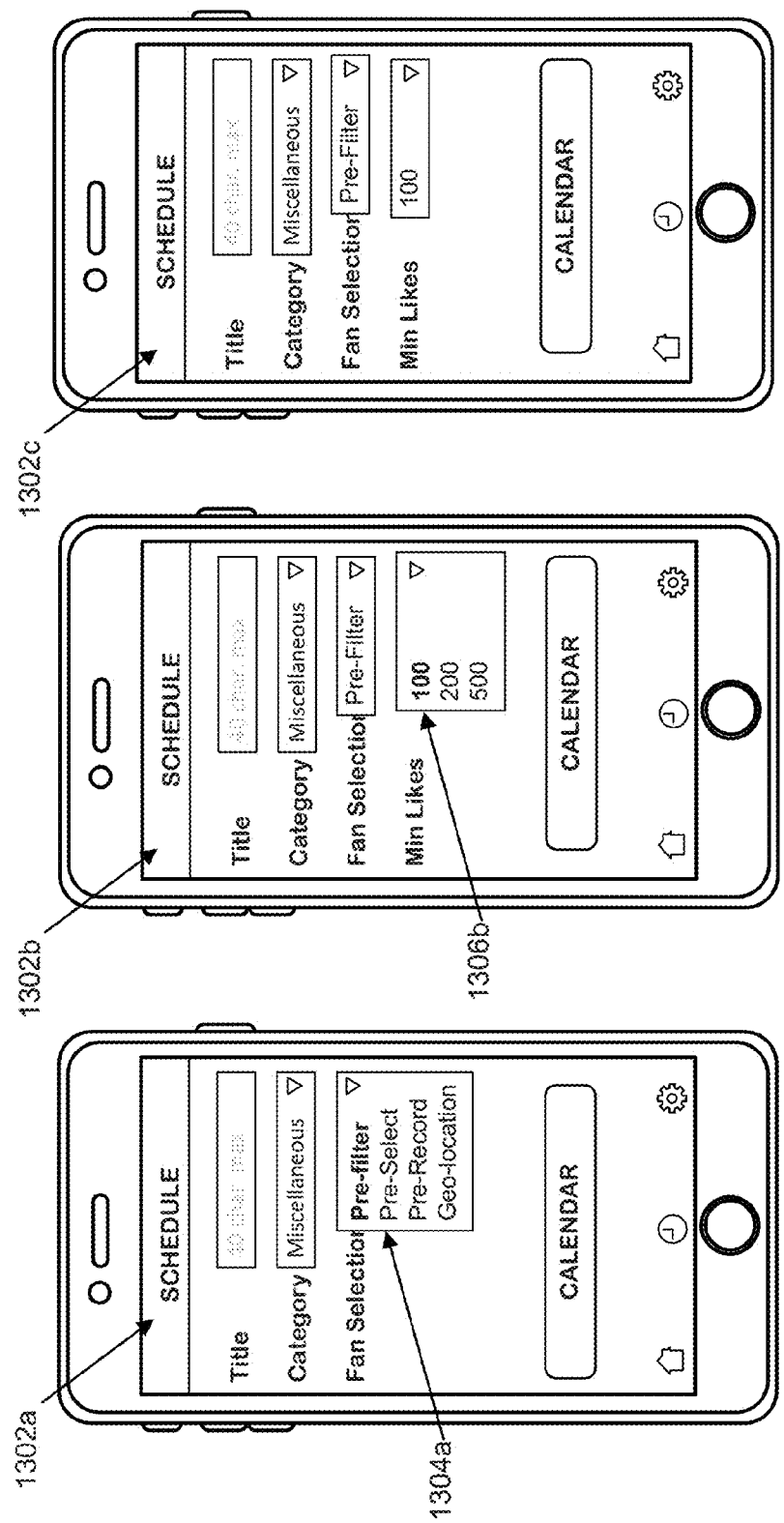
FIG. 13 shows a sequence of example user interfaces for defining a participant selection criterion based on pre-filtering.

FIG. 13 shows a sequence of example user interfaces 1302a-c that can be used to define a participant selection criterion based on pre-filtering. A user (e.g. a celebrity host) may access interface 1302a to request to initiate an interactive session (e.g. immediately or to be scheduled in the future). As shown in FIG. 13, interface 1302a may include an option 1304a through which the user can input a category of selection criterion to apply during the interactive session. For example, option 1304a is shown in interface 1302a as a pull down menu listing multiple categories of selection criterion. In response selecting "pre-filter," interface 1302b may be displayed to the user with an additional option 1306b to select a qualifier associated with the selected category of criteria. For example, in interface 1302b, option 1306b is presented as a pull down menu prompting the user to select a minimum number of likes that a given participant is required to have in order to be considered for selection. As will be described, in some embodiments, participants in an interactive session can rate (e.g. "like") each other within or outside of an interactive session. In this way fan participants can build notoriety thereby becoming more trustworthy from a host user's perspective. As shown in interface 1302c, the user setting up the interactive session has selected "pre-filter" as the selection criterion with a minimum number of likes of 100 for a given participant to be selected to interact with host user (e.g. celebrity) during the interactive session.

The example pre-filter selection criterion shown in interfaces 1302a-c based on a minimum number of likes as a qualifier is provided for illustrative purposes, but should not be construed as limiting. In other embodiments, other qualifiers may be associated with a pre-filter selection criterion. In some embodiments a pre-filter selection criterion may be based on participant affiliations, qualifications, or characteristics. For example, only participants that are members of a given celebrity's fan club may be eligible for selection. As another example, only participants connected to a particular social media platform (e.g. Facebook) may qualify for selection. As another example, only participants in a certain age range (e.g. over 18) may qualify for selection. Information regarding the characteristics of a participant may be gathered based on that participants platform account and/or information tied to any of the participant's other social media accounts. In some embodiments, a pre-filter selection criterion may include qualifiers based on capabilities of the device and/or network through which participants access the interactive session. For example, a pre-filter selection criterion may include a minimum uplink bandwidth qualifier in order to support a seamless experience during the interactive session. It will be appreciated that a given pre-filter participant selection criterion may include more than one qualifier. For example, a user requesting (e.g. via interfaces 1302a-c) to initiate an interactive session may include with the request a pre-selection criterion that participant have a minimum of 100 likes, a minimum uplink speed of 500 Kbps, and be over the age of 18.

A pre-filter participant selection criterion essentially defines a subset of the overall audience in a given interactive session from which the platform may select for direct interaction with the host. For example, as previously described with respect to FIGS. 7A-E, during an interactive session, a celebrity may take questions from audience members (i.e., "open the floor" to particular participant users) (e.g. by tapping on a Q&A 704 in interface 7A). In response to the host user "opening the floor," platform 100 may select one or more participant users in the interactive session from which to receive a media stream (e.g. a pre-recorded video message or a live video stream). If a pre-filter selection criterion exists for the interactive session, platform 100 may apply that criterion in order to select a particular participant user from which to receive the media stream (e.g. with a video question for the host user).

In some embodiments, platform 100 applies the pre-filter selection criterion to automatically select a particular participant that best meets the selection criterion. Often a number of participants in a given interactive session may meet the pre-filter selection criterion thereby establishing a subset of qualified participants. In such situations, platform 100 may apply the selection mechanics described with respect to FIG. 7C in order to select a particular participant from the subset of qualified (according to the pre-filter selection criterion) participants. For example, consider again the scenario described with respect to FIG. 7C. As shown in FIG. 7C, a video button 706 can be displayed to all qualified participants via their respective devices. Here the video button 706 is displayed to the qualified participants with a message, "first user to tap video button can live stream for 15 seconds." Accordingly, the first of the qualified participants that transmits a request (e.g. by pressing button 706) is selected by platform 100 and allowed to transmit a media stream for display to the one or more other participants and host in the interactive session. As noted, in some embodiments, this media stream may be permitted for a predetermined duration (e.g. 15 seconds), and may be terminated in response to input by the host.

Participant Selection Mechanism—Pre-Selection

Figure 14:
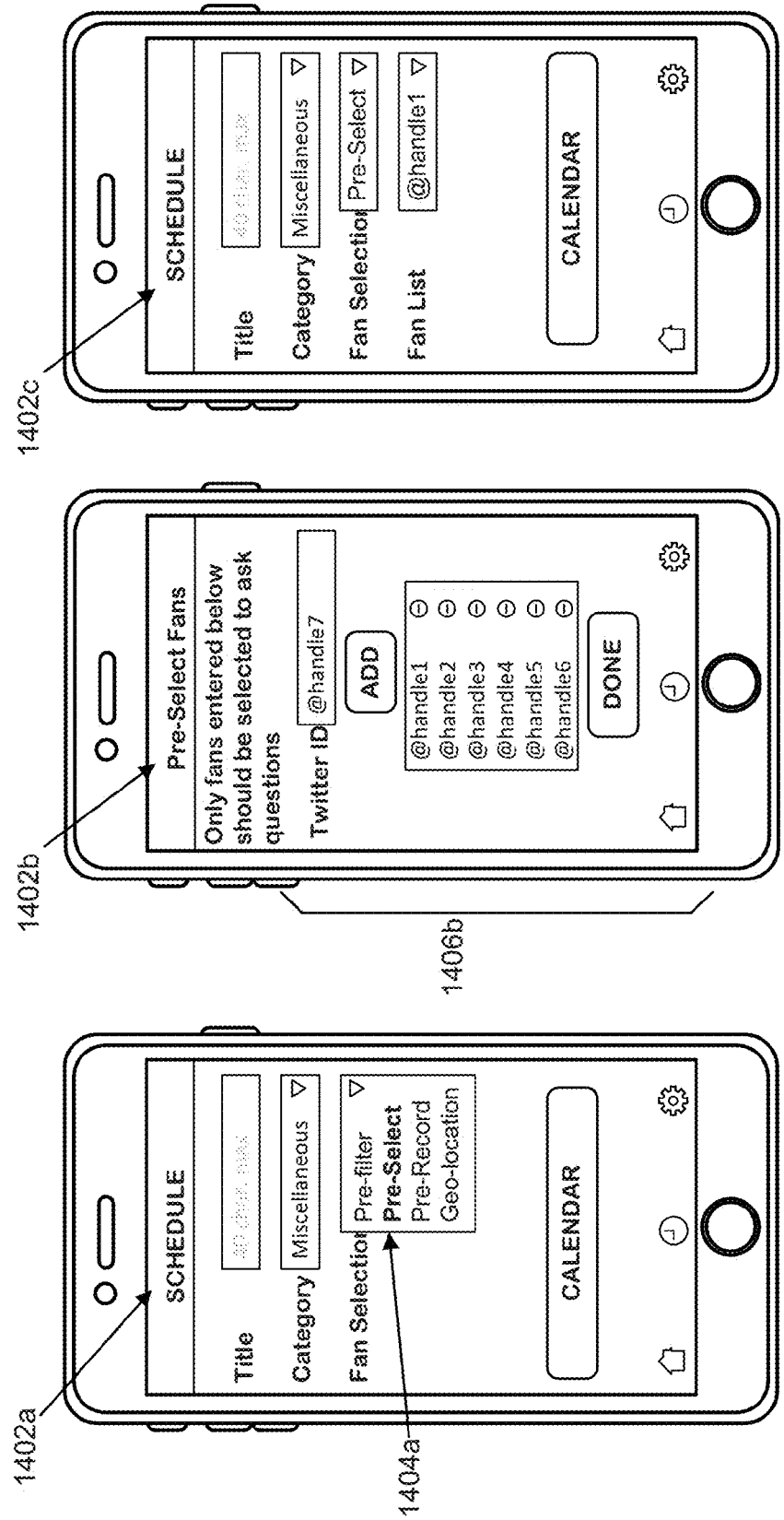
FIG. 14 shows a sequence of example user interfaces 1 for defining a participant selection criterion based on pre-selected participants.

FIG. 14 shows a sequence of example user interfaces 1402a-c that can be used to define a participant selection criterion based on pre-selecting specific participants, also referred to herein as "pre-selection." A host user (e.g. a celebrity) may access interface 1402a to request to initiate an interactive session (e.g. immediately or to be scheduled in the future). As shown in FIG. 14, interface 1402a may include an option 1404a through which the user can input a category of selection criterion to apply during the interactive session. For example, option 1404a is shown in interface 1402a as a pull down menu listing multiple categories of selection criterion. In response to selecting "pre-select," interface 1402b may be displayed to the user with an additional option 1406b to select a qualifier associated with the selected category of criteria. For example, in interface 1402b, option 1406b includes a text field through which a user can enter unique identifiers (e.g. a Twitter ID) associated with one or more participants. For example, a host user may know of one or more trusted fans from which they would be comfortable fielding questions during an interactive session. In response to entering a unique identifier (e.g. "@handle7") the user may add the entered identifier by pressing the "add" button shown in interface 1402b. The entered identifier may then be added to a list of previously entered identifiers and displayed to the host user (e.g. as shown at the list of identifiers @handle1-@handle6) so that the host user can inspect the list and make edits if necessary.

Once the host user is satisfied with the list of pre-selected identifiers, the host user can press the "done" button and is presented with display 1402c that includes the selection criterion.

The example pre-selection criterion shown in interfaces 1402a-c based on social media identifiers entered into a text field is provided for illustrative purposes, but should not be construed as limiting. In other embodiments, participants may be pre-selected using other mechanisms. For example, as will be discussed, a host user (e.g. a celebrity) may be able to access a list of the top rated (e.g. based on "likes") participants across platform 100 or from past interactive sessions involving the host. Accordingly, in some embodiments, an interface similar to interfaces 1402a-c may allow a host to select from a predefined list of top-rated participants to ad to a participant selection criterion for a given interactive session.

As with pre-filtering, pre-selection as a criterion essentially defines a subset of the overall audience in a given interactive session from which the platform 100 may select for direct interaction with the host user (e.g. a celebrity). Accordingly, in some embodiments, similar interface mechanics as described with respect to FIGS. 7A-E may similarly apply when selecting a particular participant from which to receive a media stream.

Participant Selection Mechanism—Pre-Recorded Messages

As previously mentioned, in certain situations, a celebrity may not wish to take live questions during an interactives session and may instead opt to solicit a predetermined number of pre-recorded video questions. For example, prior to the start of an interactive session, platform 100 may, in response to a selection criterion, solicit "n" number of pre-recorded videos from potential participants in the session. A host user (e.g. the celebrity or an individual associated with the celebrity) can then review the pre-recorded messages and elect to broadcast them and answer the questions during the interactive session.

Figure 15:
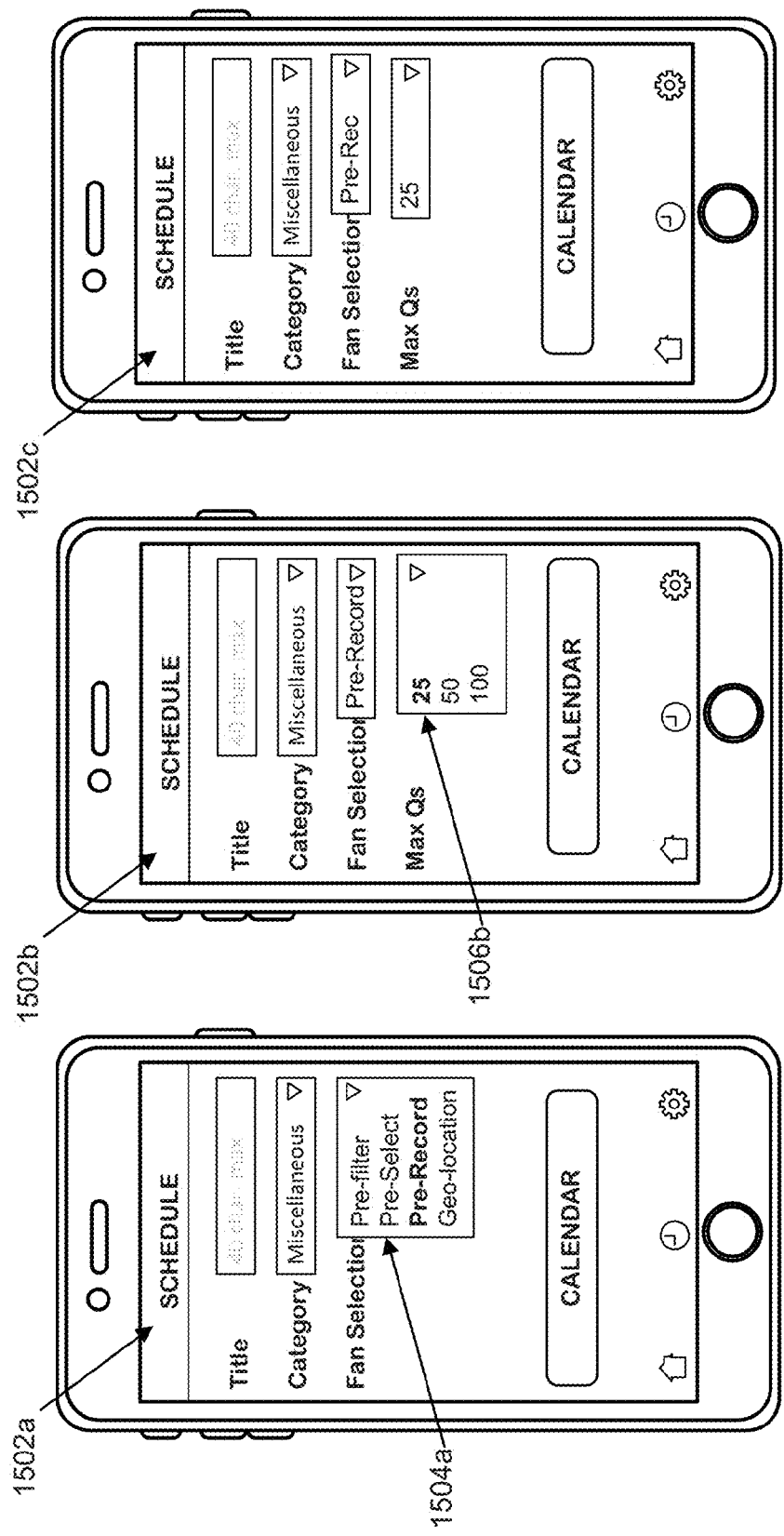
FIG. 15 shows a sequence of example user interfaces for defining a participant selection criterion based on pre-recorded media.

FIG. 15 shows a sequence of example user interfaces 1502a-c that can be used to define a participant selection criterion based on pre-recorded media, also referred to herein as "pre-record." A host user (e.g. a celebrity) may access interface 1502a to request to initiate an interactive session (e.g. immediately or to be scheduled in the future). As shown in FIG. 15, interface 1502a may include an option 1504a through which the user can input a category of selection criterion to apply during the interactive session. For example, option 1504a is shown in interface 1502a as a pull down menu listing multiple categories of selection criterion. In response to selecting "pre-record," interface 1502b may be displayed to the user with an additional option 1506b to select a qualifier associated with the selected category of criteria. For example, in interface 1502b, option 1506b includes a pull down menu prompting the user to select the maximum number of pre-recorded messages to solicit from participants prior to and/or during an interactive session. As shown in interfaces 1502b and 1502c, the user has selected 25 as the maximum number of pre-recorded messages to receive. Note in some embodiments, a qualifier such as "Max Qs" may refer to the maximum number of pre-recorded messages that can be received from an already approved pool of participants (e.g. through the aforementioned pre-filtering and/or pre-selection). Alternatively, any number of participants may submit a pre-recorded message and "Max Qs" qualifier may refer to the number of those pre-recorded messages that are then forwarded to the user for approval. For example, consider that 1000 participants are signed up for a scheduled interactive session. A user may, via interfaces 1502a-c, input a participant selection criterion based on pre-recorded messages specifying the maximum number of messages at 25. One hundred of the 1000 participants submit a pre-recorded message, however based on the selection criterion, platform 100 automatically selects 25 of the submitted 100 questions to forward to the user for approval before placing in a pool of approved pre-recorded messages. For example, platform 100 may automatically select 25 of the 100 participants that best match other selection criterion (e.g. pre-filter, pre-select, geo-targeting, etc.). If the user only approves 15 of the forwarded 25 pre-recorded messages, platform may automatically forward additional un-selected messages from the pool of 100 to the user for approval until a total of 25 messages are approved or the pool of 100 is depleted.

Although not shown in FIG. 15, a user may be prompted to enter other qualifiers to the selection criterion based on pre-recording. For example, a user may specify that prerecorded messages be of a certain length (e.g. max 15 seconds), a certain quality (e.g. min resolution, framerate, bit rate, etc.), a certain format (e.g. mpeg-4), in a certain language (e.g. English), etc.

Figure 16:
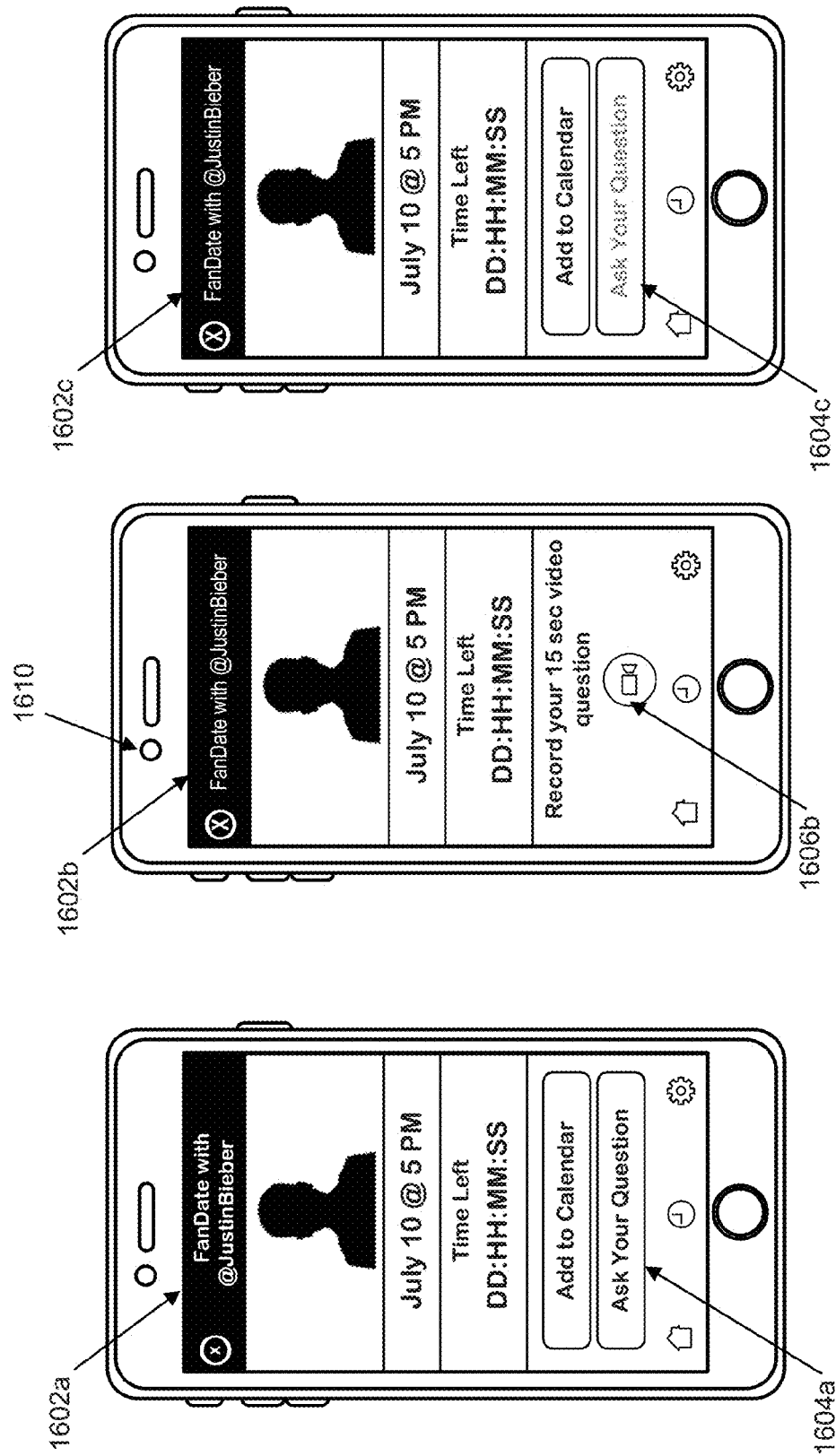
FIG. 16 shows a sequence of example user interfaces for pre-recording a message to be streamed during an interactive session.

FIG. 16 shows a sequence of example user interfaces 1602a-c that can be used by a participant to pre-record a message for inclusion in the interactive session that has a pre-record selection criterion applied. Interface 1602a depicts a screenshot of a start page for an interactive session (e.g. a FanDate with Justin Bieber). Participants may view the start page shown at interface 1602a at their device before the interactive session is initiated. For example, the start page may include information on the scheduled interactive session including a title, the celebrity hosting the session, a category, sponsorship information, and a countdown to start time of the session. The start page may further include advertisements, previews for other upcoming sessions, media clips from previous sessions, media clips about the corresponding celebrity, etc. The start page may also include an option 1604 to pre-record a message. For example option 1604a is shown in interface 1602 as a button, "Ask Your Question." In response to selecting button 1604a, a participant user may be presented with interface 1602b through which they can record their message. For example interface 1602b may include camera button 1606b which when pressed causes the participant's device to record video via an associated camera, for example integrated front facing camera 1610. The recorded video may then be transmitted by the participant's device to platform 100 before being forwarded to the host user (e.g. in this example Justin Bieber or a user representing Bieber) for pre-approval before the interactive session. In some embodiments, the pre-recorded video may be restricted in length. For example, as shown in interface 1602b, a participant may record a 15 second long video question. Note that the length of the pre-recorded media may in some embodiments be set based on an qualifier associated with the selection criterion that is entered, for example, via interfaces 1502a-c of FIG. 15.

Returning to FIG. 16, as shown in interface 1602c, option 1604a to pre-record a video message may in some situations be unavailable to a participant user, for example, as shown at unavailable button 1604c. The option to pre-record a video message may be unavailable for a number of reasons. For example, the max number of pre-recorded messages (as set via interfaces 1502a-c) may have already been reached at the time that a participant access interface 1602a-c. As another example, the participant may not qualify to submit a prerecorded video because they do not qualify under another selection criterion (e.g. pre-filter, pre-selection, etc.). For example, a user accessing interface 1602c may be on a blacklist and ineligible to submit pre-recorded messages.

As mentioned, prior to or during an interactive session, platform 100 may present selected pre-recorded messages for the host (e.g. a celebrity) to vet and selection for inclusion in the session. For example, in some embodiments similar to as shown in FIG. 7A, a host user can press a "Q&A" button 704 and be presented with a list of selected and/or pre-approved vide messages from fans. In response to selecting, by the host user, one of the video messages, the message may be streamed from the particular participants device or from platform 100 and be displayed via the devices of the other participants in the interactive session.

Participant Selection Mechanism—Geo-Targeting

Interacting with select, geo-located communities could be important for certain celebrities to further their cause. A classic example of this participant selection mechanism may be in politics, wherein the politician can address questions from a certain community (town or city), even though he/she is not physically present. A virtual town hall meeting is the best way to describe this sort of interaction.

Figure 17:
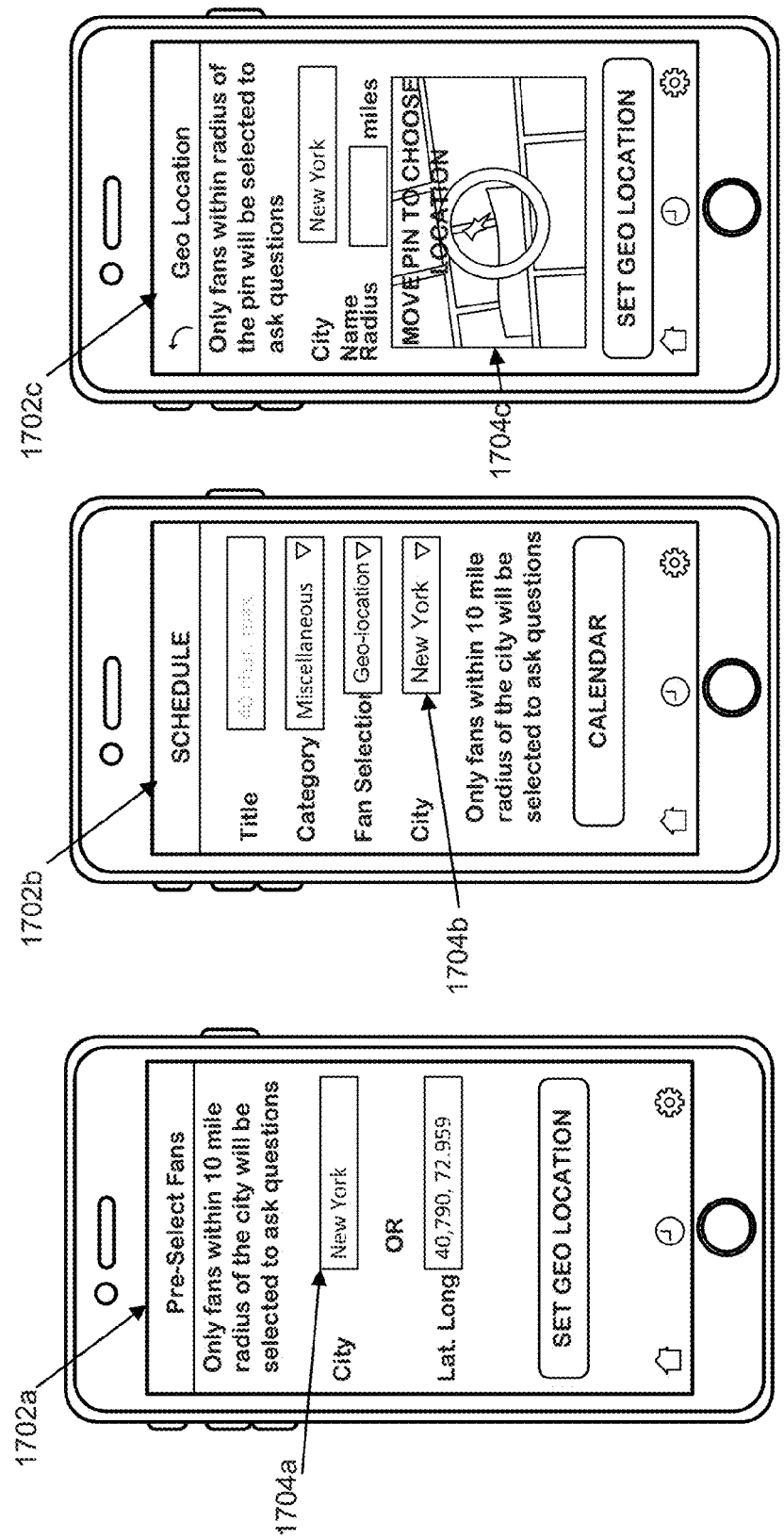
FIG. 17 shows a series of example user interfaces for defining a participant selection criterion based on geo-location.

FIG. 17 shows a series of example interfaces 1702a-c that can be used to define a participant selection criterion based on geo-location of participants, also referred to herein as "geo-targeting." As shown in interfaces 1702a-c, a host user (e.g. a celebrity) may be presented with a number of options to set a geographic location as a participant selection criterion. For example, as shown in interface 1702a, a user may be presented with an option 1704a in the form of a text box in which to enter a location (e.g. a location identifier such as a city name or set of coordinates). Similarly, as shown in interface 1702b, a user may be presented with an option 1704b in the form of pull down menu to select one or more of a pre-defined set of locations (e.g. New York). As anther example, as shown in interface 1702c, a user may be presented with an interactive map to select or "pin" a particular geographic location to set the selection criterion. In each of these options 1704a-c, the selection criterion may define participants within a threshold distance of the selected location as eligible to stream media from their device. This threshold distance may be set by the platform 100. For example interfaces 1702a and 1702b allow a user to select a location, however the threshold distance in both instances is set at a 10 mile radius from the selected location. Alternatively, the user may be presented with an option to select a particular radius from the selected location on which to base the selection criterion, for example, as shown with the editable text box in interface 1702c.

Prior to and/or during an interactive session, selection criterion based on geo-targeting, may be applied by receiving, by platform 100, location data from participant devices used to connect to the interactive session. For example, many modern mobile device include means for detecting a location of the device (e.g. GPS receivers, accelerometers, computer network localizing, etc.). Upon signing into an account with platform 100, a participant device (e.g. a smart phone device) may transmit to platform 100 a geographic location which then may be used by platform 100 to apply a geo-targeting selection criterion by comparing the received location of the participant device with an geographic area/ location defined by the selection criterion. If the location of the participant device falls within a threshold distance from the host-specified location, the participant user of the device may be eligible to stream media (e.g. live or pre-recorded video) to the host and other participants during the interactive session.

Fan Selection Mechanism—Blacklisting

A celebrity might want to completely eliminate certain individuals from being selected to steam media (e.g. ask video questions). Blacklisting such individuals at the platform level may ensure that these individuals are never selected during any of the celebrity's broadcast sessions. In some embodiments, individuals can be blacklisted in a process that is similar to the process of defining a pre-selection criterion described with respect to FIG. 14. In other words, a host user (e.g. a celebrity) can enter, via an interface similar to 1402b in FIG. 14, one or more unique identifiers associated with individuals that they do not want to receive a media stream from during an interactive session. For example these induvial may have caused trouble on past interactive session or have a particularly low peer-rating (e.g. number of likes). Alternatively these individuals may have been blacklisted by other host users (e.g. celebrities) during previous interactive sessions. For example, when a host user accesses an interface similar to interface 1402b to define a blacklist, they may be prompted to one or more individuals that are currently blacklisted at a platform level. As with pre-selection, a user may blacklist certain individuals by entering a unique identifier (e.g. a social media handle) that corresponds to that individual.

As previously mentioned, to provide a greater degree of control over an interactive session, a host user (e.g. a celebrity) may have the option while a particular participant is streaming media (e.g. live or pre-recorded video) to terminate that participants stream at any time. For example, an interface viewable by the host user may include a button to terminate the stream from a particular participant at any time. In some embodiments, the act of selecting the button to terminate the media stream from the particular participant may automatically add that particular participant to a blacklist. The host user can then select a "Q&A" button to cause the system to automatically select the next particular participant from which to receive a media stream (e.g. a vide question).

Participant Notoriety

Figure 18:
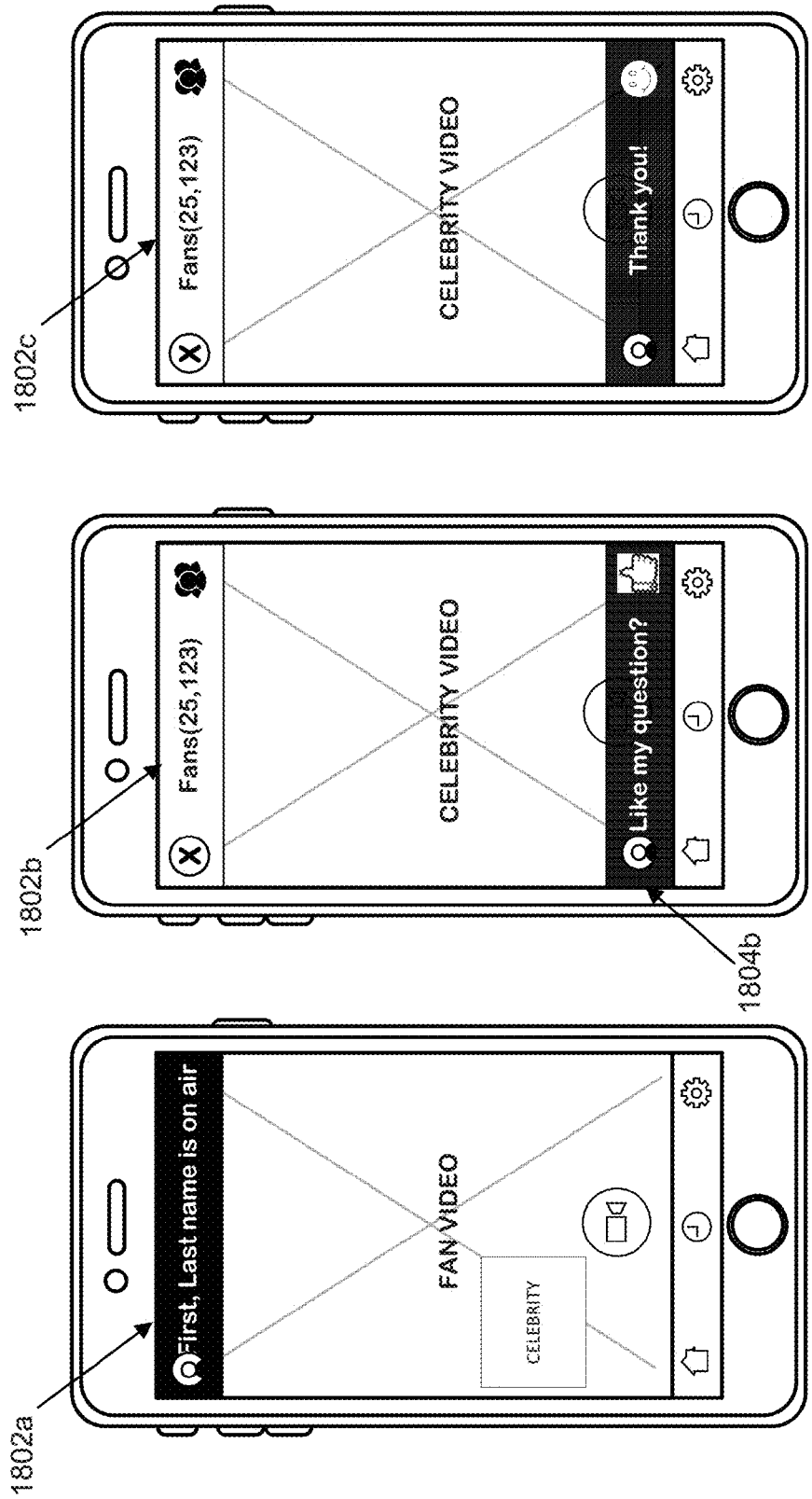
FIG. 18 shows a sequence of example user interfaces receiving participant ratings.

As discussed previously, participant users can build notoriety through gathering "likes" from other participants and from a host user during an interactive session. FIG. 18 shows a sequence of example user interfaces 1802a-c that can be used to receive participant ratings, for example in the form of likes from other participants in an interactive session. For example, interfaces 1802a-c may be from the perspective of a participant user other than the host user or the selected user from which a media stream (e.g. a video question has been received). As shown FIG. 18, a media stream (e.g. a vide question) received from a selected particular participant (e.g. a fan) may be displayed to another participant via interface 1802a for a predetermined amount of time (e.g. 15 seconds) or until a host user terminates the stream. In response to the stream ending, the participant viewing interface 1802b may be presented with an option 1804b to rate the media stream and/or particular participant from which the stream was received. For example, option 1804b as shown in interface 1802b asks the participant user if they liked the question asked in the media stream. In response to receiving an input (e.g. liking or declining to like), a participant user may be presented with interface 1802c.

Figure 19:
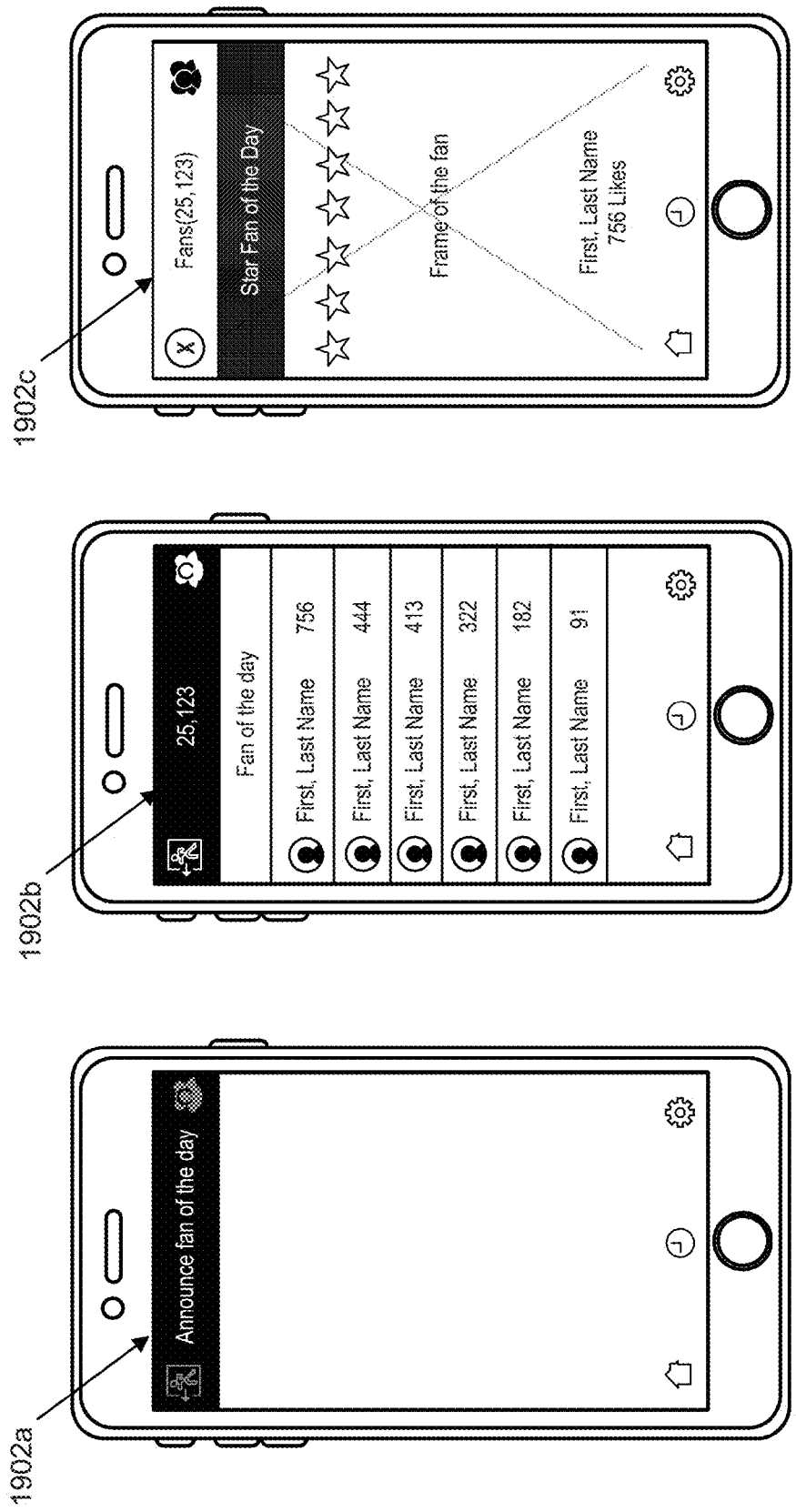
FIG. 19 shows a sequence of example user interfaces for announcing top rated participants during or following an interactive session.

FIG. 19 shows a sequence of example user interfaces 1902a-c that can be used to announce top rated participants during or following an interactive session. For example, in an embodiment, interface 902a provides an option to a host user (e.g. a celebrity) to announce a fan leaderboard to the participants in the interactive session. The option shown in interface 1902a can be presented to a host user during and/or at the conclusion of the interactive session. In response to an input by the host user electing to announce the fan of the day, interface 1902b may present a leaderboard including ranked participants for the session (e.g. according to received likes). The leaderboard shown in interface 1902b can be presented to all the participants or may be presented only to the host user. In some embodiments, a host user can select one or more of the ranked participants included in the leaderboard shown at 1902b as the "star fan of the day." In response, interface 1902c may be presented to the participants that announce the star fan of the day. The announcement in interface 1902c can include information on the participant (e.g., name, photo, number of likes, etc.) and may, in some embodiments, present some type of celebratory animation or video.

Processing System

Figure 20:
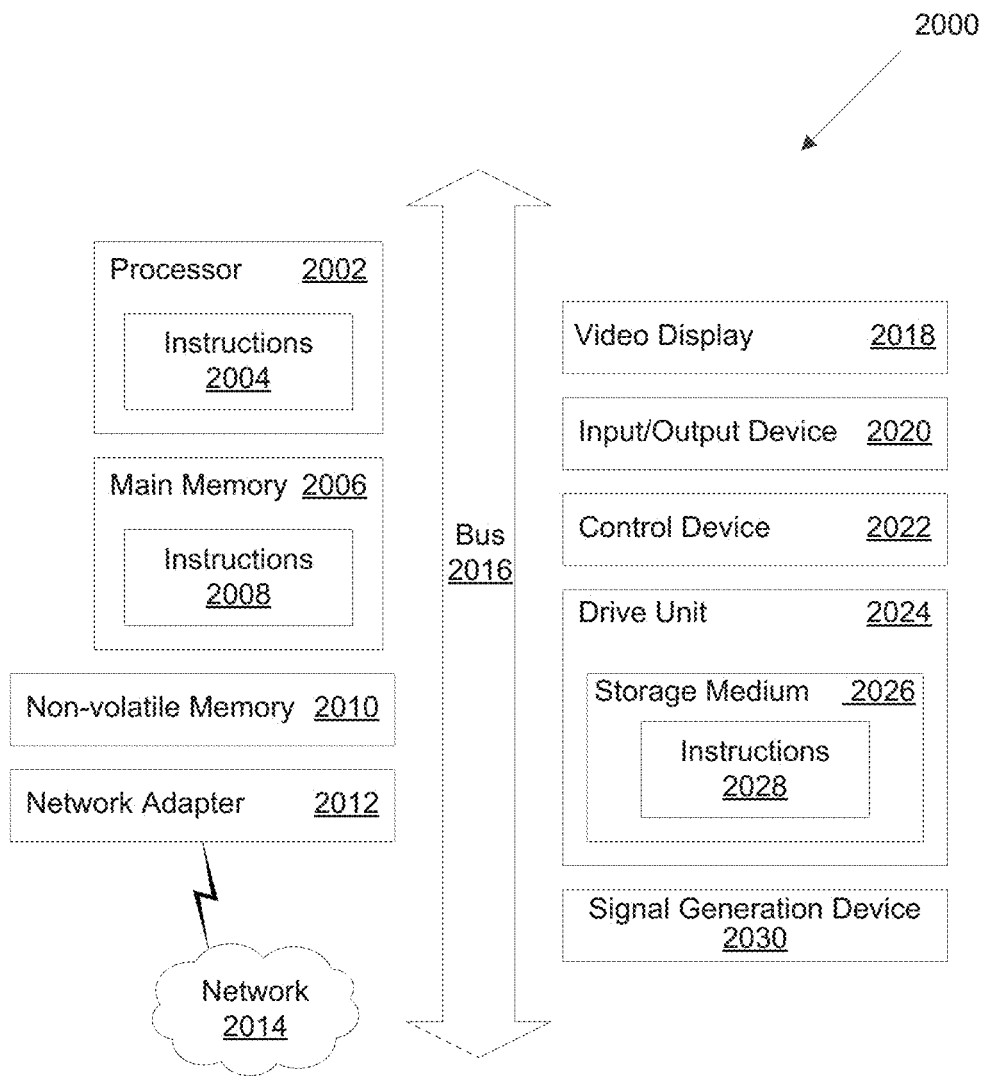
FIG. 20 is a block diagram illustrating an example of a processing system in which at least some operations described herein can be implemented.

FIG. 20 is a block diagram illustrating an example of a processing system 2000 in which at least some operations described herein can be implemented. The processing system 2000 may be or be part of a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system may include one or more central processing units ("processors") 2002, main memory 2006, non-volatile memory 2010, network adapter 2012 (e.g., network interfaces), video display 2018, input/output devices 2020, control device 2022 (e.g., keyboard and pointing devices), drive unit 2024 including a storage medium 2026, and signal generation device 2030 that are communicatively connected to a bus 2016. The bus 2016 is illustrated as an abstraction that represents any one or more separate physical buses, point to point connections, or both connected by appropriate bridges, adapters, or controllers. The bus 2016, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 2094 bus, also called "Firewire."

In various embodiments, the processing system 2000 operates as part of a user device, although the processing system 2000 may also be connected (e.g., wired or wirelessly) to the user device. In a networked deployment, the processing system 2000 may operate in the capacity of a server or a client machine in a client-server network environment, or as a peer machine in a peer-to-peer (or distributed) network environment.

The processing system 2000 may be a server computer, a client computer, a personal computer (e.g., a laptop or desktop computer), a tablet, a personal digital assistant (PDA), a mobile phone, an iPhone®, an iPad®, a Blackberry®, a processor, a web appliance, a network router, switch or bridge, a console, a hand-held console, a gaming device, a music player, or any machine capable of executing a set of instructions (sequential or otherwise) that specify actions to be taken by the processing system.

While the main memory 2006, non-volatile memory 2010, and storage medium XX26 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2028. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 2004, 2008, 2028) set at various times in various memory and storage devices in a computer, and that, when read and executed by one or more processing units or processors 2002, cause the processing system 2000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 2010, floppy and other removable disks, hard disk drives, optical disks (e.g., Compact Disk Read-Only Memory (CD ROMS), Digital Versatile Disks (DVDs)), and transmission type media, such as digital and analog communication links.

The network adapter 2012 enables the processing system 2000 to mediate data in a network 2014 with an entity that is external to the processing system 2000 through any known and/or convenient communications protocol supported by the processing system 2000 and the external entity. The network adapter 2012 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 2012 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A method comprising:
   receiving, by a computer system, from a host device, a request to initiate an interactive session with a plurality of participant devices communicatively coupled via a computer network, the request including a participant selection criterion;
   initiating, by the computer system, the interactive session between the host device and the plurality of participant devices, wherein the interactive session includes a first communication channel enabling a first media stream from the host device for the duration of the interactive session; and
   in response to receiving, by the computer system, from the host device during the interactive session, a request to open the interactive session to a second media stream from one of the plurality of participant devices:

applying, by the computer system, the participant selection criterion to select a particular participant device of the plurality of participant devices from which to receive the second media stream during the interactive session;

opening, by the computer system, a second communication channel enabling the second media stream from the selected particular participant device for a limited period of time during the interactive session;

synchronizing, by the computer system, the first and second media streams; and causing display, by the computer system, at the host device and the plurality of participant devices, of the synchronized first and second media streams.

2. The method of claim 1, wherein the host device is operated by a celebrity user.

3. The method of claim 1, wherein the participant selection criterion is based on an input received via a graphical interface at the host device, the graphical interface including an option to select from a plurality of user-selectable types of participant selection criteria.

4. The method of claim 3, wherein the graphical interface is accessible via any of a web browser, a software program, a mobile application, and an over-the-top (OTT) application.

5. The method of claim 1, wherein the first and second media streams include any of video, audio, photos, text, or metadata.

6. The method of claim 1, wherein the second media stream includes a video-recorded question by a user of the particular participant device for a user of the host device.

7. The method of claim 1, wherein the second media stream was pre-recorded at the particular participant device prior to the interactive session.

8. The method of claim 1, further comprising:
determining, by the computer system, that a user of the host device is qualified to initiate an interactive session based on a level of notoriety of the user of the host device.

9. The method of claim 1, wherein the participant selection criterion includes a specified qualifier value and wherein applying the participant selection criterion includes:
receiving, by the computer system, information regarding the particular participant device and/or a user of the particular participant device; and
determining, by the computer system, that the particular participant device qualifies to be selected if, based on the received information, the specified qualifier value is satisfied.

10. The method of claim 9, wherein the specified qualifier value is any of a minimum number of social media followers, a minimum number of likes, a minimum uplink speed, or a minimum user age.

11. The method of claim 1, wherein the participant selection criterion includes a pre-selected identifier and wherein applying the participant selection criterion includes:
receiving, by the computer system, an identifier from the particular participant device; and
determining, by the computer system, that the particular participant device qualifies to be selected if the received identifier matches the pre-selected identifier.

12. The method of claim 11, wherein the identifier is any of a user identifier, device identifier, or a computer network address.

13. The method of claim 1, wherein the participant selection criterion includes a pre-selected geographic location and wherein applying the participant selection criterion includes:

receiving, by the computer system, a geographic location of the particular participant device; and
determining, by the computer system, that the particular participant device qualifies to be selected if the location of the particular participant device is within a threshold distance of the pre-selected geographic location.

14. The method of claim 1, further comprising:
automatically terminating the second media stream from the particular participant device in response to:
determining that the limited period of time has expired; or
receiving a request to terminate the second media stream from the host device.

15. The method of claim 1, further comprising:
placing a user of the particular participant device on a blacklist in response to receiving an input from the host device.

16. The method of claim 1, further comprising:
in response to terminating the second media stream from the particular participant device:
applying, by the computer system, the participant selection criterion to select a second particular participant device from which to receive a third media stream during the interactive session;
opening, by the computer system, a third communication channel enabling the third media stream from the second particular participant device for a limited period of time during the interactive session;
synchronizing, by the computer system, the first and third media streams; and
causing display, by the computer system, at the host device and the plurality of participant devices, of the synchronized first and third media streams.

17. The method of claim 1, wherein the particular participant device is one a subset of the plurality of participant devices that qualify for selection based on the participant selection criterion and wherein applying the participant selection criterion includes:
causing display, at the subset of qualified participant devices, of a prompt to initiate the second media stream;
receiving a request from the particular participant device to initiate the second media stream, the request including a timestamp; and
determining, based on the timestamp, that the request from the particular participant device has priority over other requests from one or more of the other qualified participant devices.

18. The method of claim 1, further comprising:
causing display, at the host device and the plurality of participant devices, of a prompt to submit a rating of a user of the particular participant device, following termination of the second media stream.

19. The method of claim 1, further comprising:
causing display, at the host device and the plurality of participant devices, of a participant leaderboard based on participant ratings received during the interactive session.

20. A computer system comprising:
a processing device; and
a storage device having instructions stored thereon, which when executed by the processing device cause the computer system to:
receive, from a host device, a request to initiate an interactive session with a plurality of participant devices communicatively coupled via a computer network, the request including a participant selection criterion;

initiate the interactive session between the host device and the plurality of participant devices, wherein the interactive session includes a first communication channel enabling a first media stream from the host device for the duration of the interactive session; and in response to receiving, from the host device during the interactive session, a request to open the interactive session to a second media stream from one of the plurality of participant devices:
- apply the participant selection criterion to select a particular participant device of the plurality of participant devices from which to receive the second media stream during the interactive session;
- open a second communication channel enabling the second media stream from the selected particular participant device for a limited period of time during the interactive session;
- synchronize the first and second media streams; and
- cause display, at the host device and the plurality of participant devices, of the synchronized first and second media streams.

21. The computer system of claim 20, wherein the host device and the plurality of participant devices are communicatively coupled via an application programming interface that is executed by an application instantiated at each device.

22. A non-transitory computer readable medium containing instructions, execution of which in a computer system causes the computer system to:
- receive, from a host device, a request to initiate an interactive session with a plurality of participant devices communicatively coupled via a computer network, the request including a participant selection criterion;
- initiate the interactive session between the host device and the plurality of participant devices, wherein the interactive session includes a first communication channel enabling a first media stream from the host device for the duration of the interactive session; and
- in response to receiving, from the host device during the interactive session, a request to open the interactive session to a second media stream from one of the plurality of participant devices:
  - apply the participant selection criterion to select a particular participant device of the plurality of participant devices from which to receive the second media stream during the interactive session;
  - open a second communication channel enabling the second media stream from the selected particular participant device for a limited period of time during the interactive session;
  - synchronize the first and second media streams; and
  - causing display, at the host device and the plurality of participant devices, of the synchronized first and second media streams.

* * * * *